(12) United States Patent
Yoshihara et al.

(10) Patent No.: US 7,365,963 B2
(45) Date of Patent: Apr. 29, 2008

(54) CAPACITOR ELEMENT, SOLID ELECTROLYTIC CAPACITOR, PROCESSES FOR THEIR PRODUCTION AND CAPACITOR ELEMENT COMBINATION

(75) Inventors: Yumiko Yoshihara, Chuo-ku (JP); Masaaki Kobayashi, Chuo-ku (JP)

(73) Assignee: TDK Corporation, Tokyo (JP)

( * ) Notice: Subject to any disclaimer, the term of this patent is extended or adjusted under 35 U.S.C. 154(b) by 437 days.

(21) Appl. No.: 10/546,679

(22) PCT Filed: Mar. 17, 2004

(86) PCT No.: PCT/JP2004/003583

§ 371 (c)(1),
(2), (4) Date: Aug. 23, 2005

(87) PCT Pub. No.: WO2004/084243

PCT Pub. Date: Sep. 30, 2004

(65) Prior Publication Data

US 2006/0092598 A1    May 4, 2006

(30) Foreign Application Priority Data

Mar. 17, 2003  (JP)  .............................. 2003-072132
Mar. 28, 2003  (JP)  .............................. 2003-091771

(51) Int. Cl.
*H01G 4/228* (2006.01)
(52) U.S. Cl. ...................... 361/540; 361/523; 361/528; 361/529; 361/516
(58) Field of Classification Search ................ 361/540, 361/516–519, 508, 509, 512, 523, 525, 528–529, 361/530, 534, 541
See application file for complete search history.

(56) References Cited

U.S. PATENT DOCUMENTS 4,831,494 A    5/1989   Arnold et al.

(Continued)

FOREIGN PATENT DOCUMENTS

EP    0 936 642 A2    8/1999

(Continued)

*Primary Examiner*—Nguyen T. Ha
(74) *Attorney, Agent, or Firm*—Oliff & Berridge, PLC

(57) ABSTRACT

The invention provides a capacitor element and solid electrolyte capacitor which allow significant increase in electrostatic capacity with the same dimensions and shape, as well as a process for their production. The capacitor element 12 of the invention is provided with an aluminum base 18 having a shape with a plurality of sides 1a, 1b, anode sections 30 partially formed at the edge region 3a, 3b of at least one side among the plurality of sides in the area on the main surface 12b of the aluminum base 18, cathode sections 32 comprising a solid electrolyte layer 22 formed on the aluminum base 18 via an aluminum oxide film 20 and a silver paste layer 26 formed on the solid electrolyte layer 22, which are formed on the remaining regions 31 from the regions on which the anode sections 30 are formed, in the area on the main surface 12b of the aluminum base 18, and slits 28 which provide electrical insulation between the anode sections 30 and cathode sections 32. As a result, the anode sections 30 are positioned inward from the outer perimeter 52 of the aluminum base 18 on which the cathode sections 32 are formed, and therefore the area of the capacitor element 12 may be increased to approach the area of the external dimensions of the capacitor 10 fabricated using the capacitor element 12.

17 Claims, 20 Drawing Sheets

U.S. PATENT DOCUMENTS

| | | |
|---|---|---|
| 5,369,545 A | 11/1994 | Bhattacharyya et al. |
| 5,880,925 A | 3/1999 | DuPre et al. |
| 6,151,205 A * | 11/2000 | Kobayashi et al. ......... 361/523 |
| 6,185,091 B1 | 2/2001 | Tanahashi et al. |
| 6,407,904 B1 | 6/2002 | Kuroda et al. |
| 6,510,045 B2 * | 1/2003 | Mido et al. ................. 361/529 |
| 6,590,762 B2 | 7/2003 | Greenwood et al. |
| 6,661,645 B1 * | 12/2003 | Sakai et al. ................. 361/523 |
| 6,816,358 B2 * | 11/2004 | Kida et al. ................. 361/540 |
| 6,862,169 B2 * | 3/2005 | Kuroyanagi ................. 361/523 |
| 7,038,905 B2 * | 5/2006 | Yoshihara et al. .......... 361/540 |
| 7,227,739 B2 * | 6/2007 | Kobayashi .................. 361/523 |
| 7,283,350 B2 * | 10/2007 | Katraro et al. .............. 361/523 |

FOREIGN PATENT DOCUMENTS

| | | |
|---|---|---|
| JP | Y2 6-31715 | 8/1994 |
| JP | A 7-27144 | 1/1995 |
| JP | A 10-163072 | 6/1998 |
| JP | A 11-288846 | 10/1999 |
| JP | A 2000-323354 | 11/2000 |
| JP | A 2001-307955 | 11/2001 |
| JP | A 2002-313676 | 10/2002 |
| JP | A 2003-77764 | 3/2003 |
| JP | A 2003-77768 | 3/2003 |

* cited by examiner

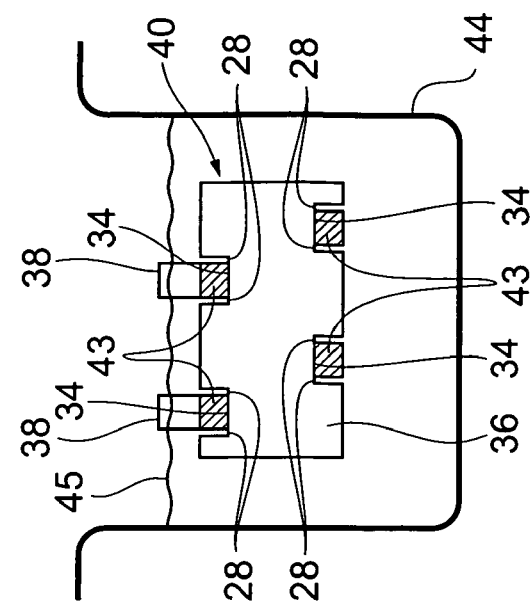
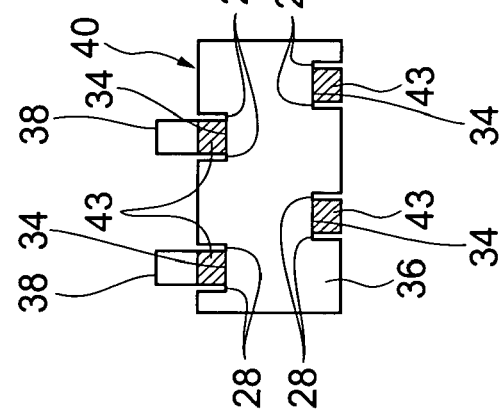
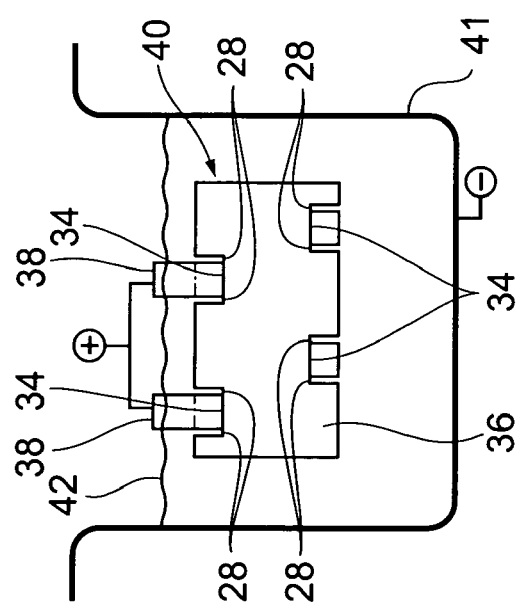

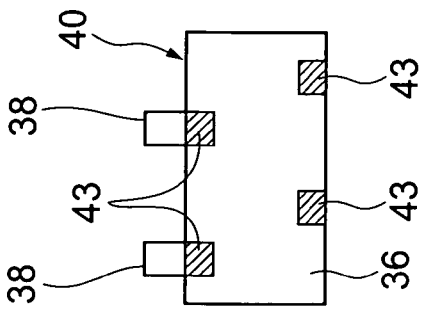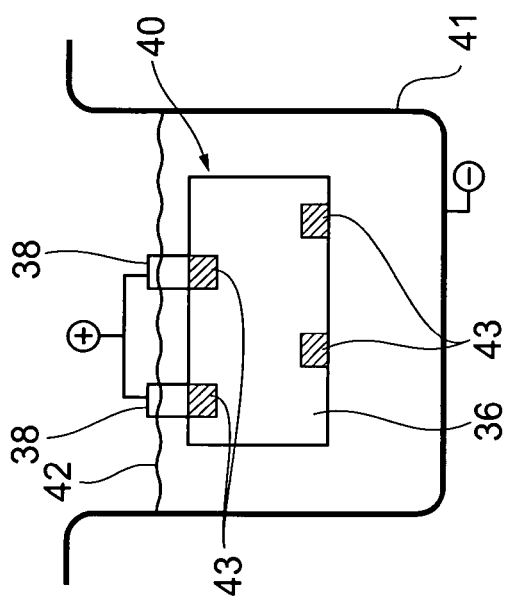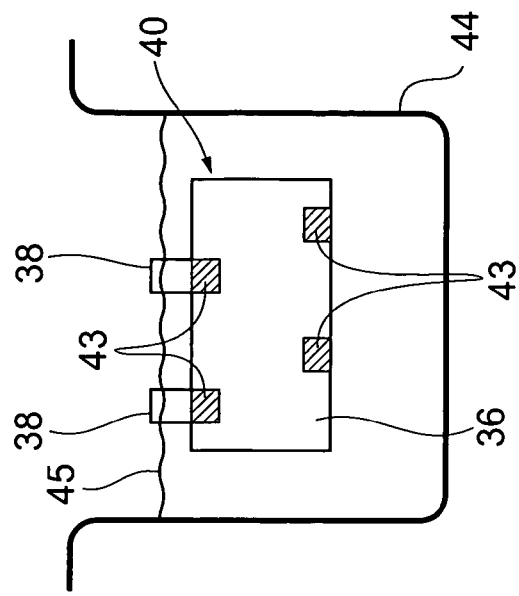

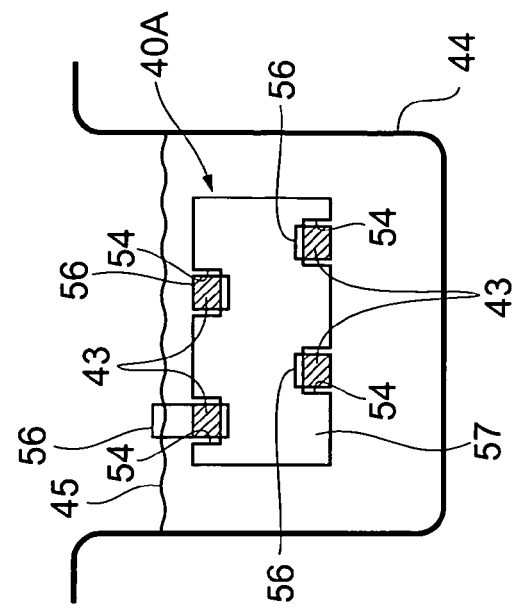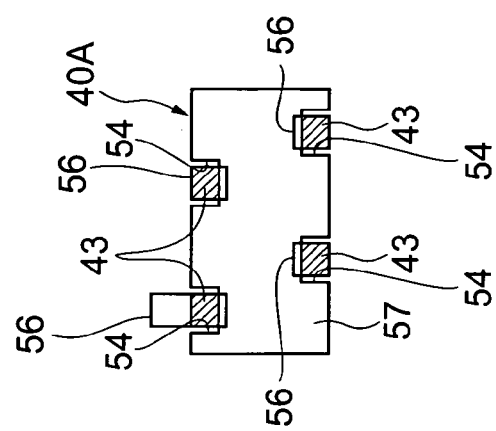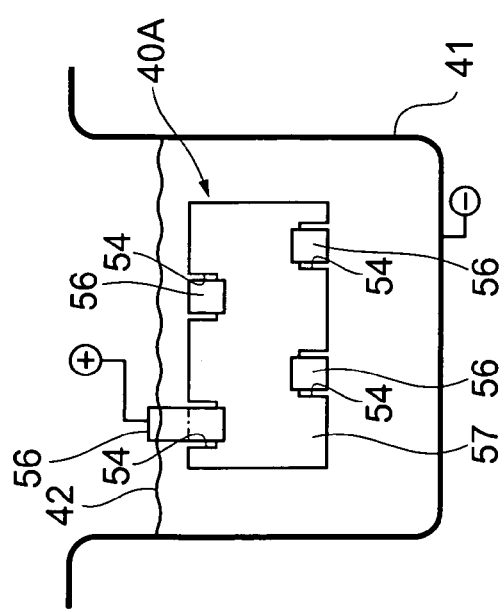

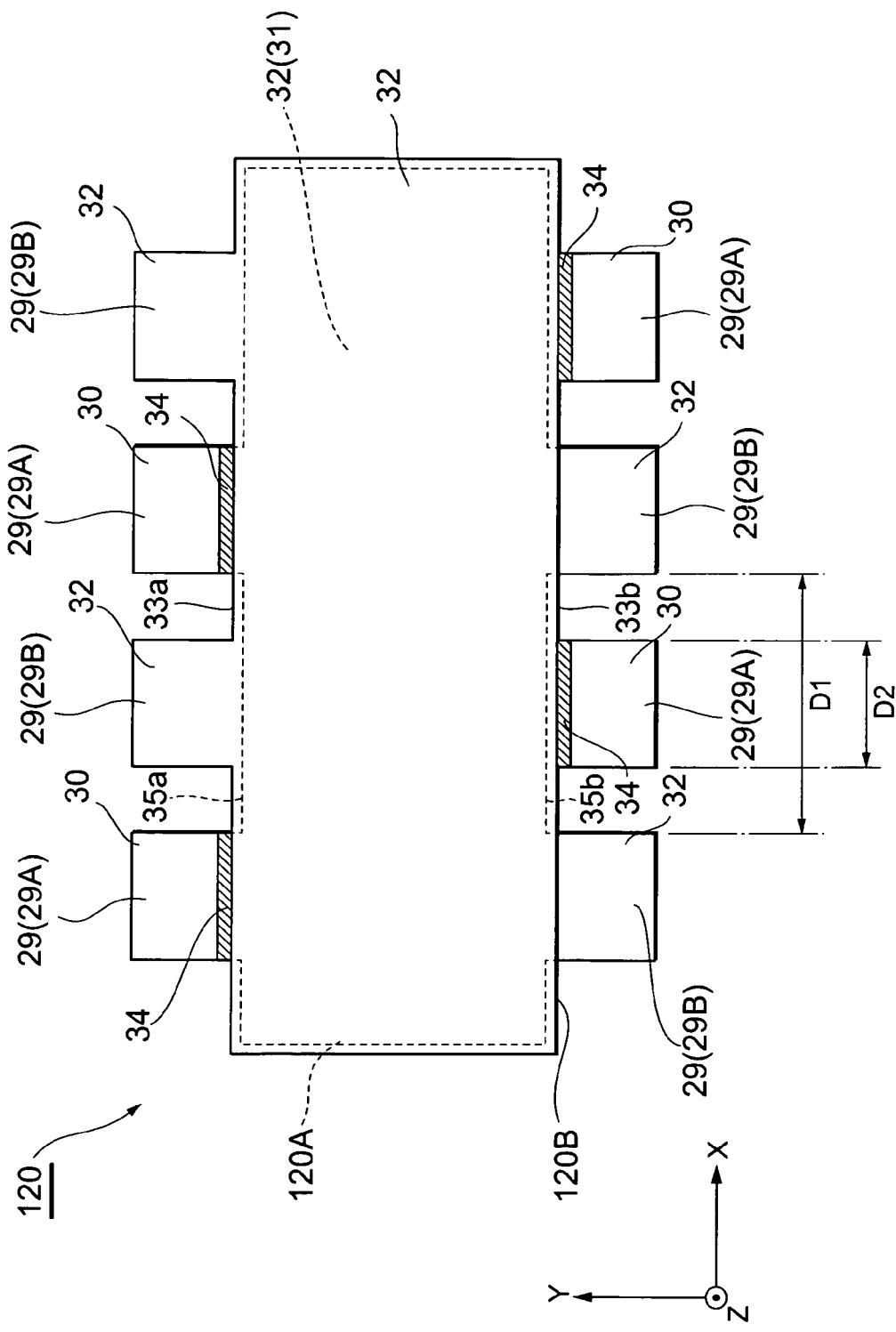

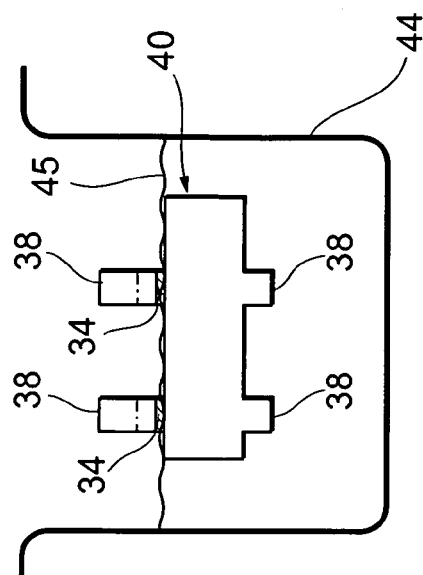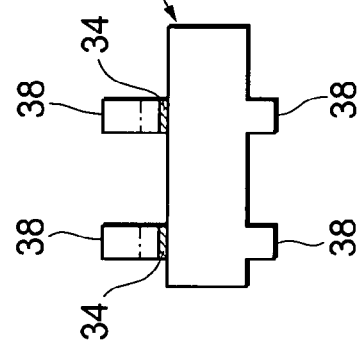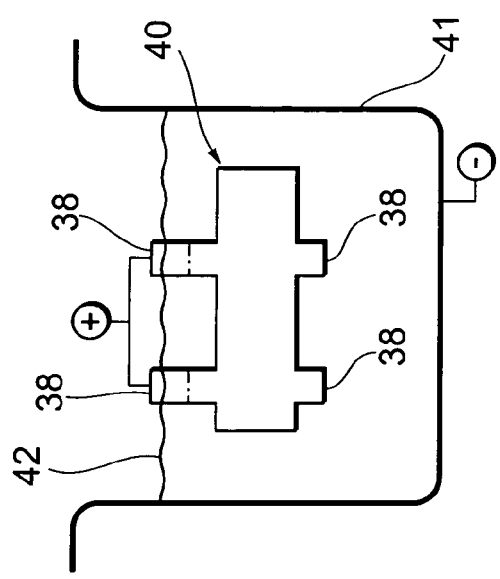

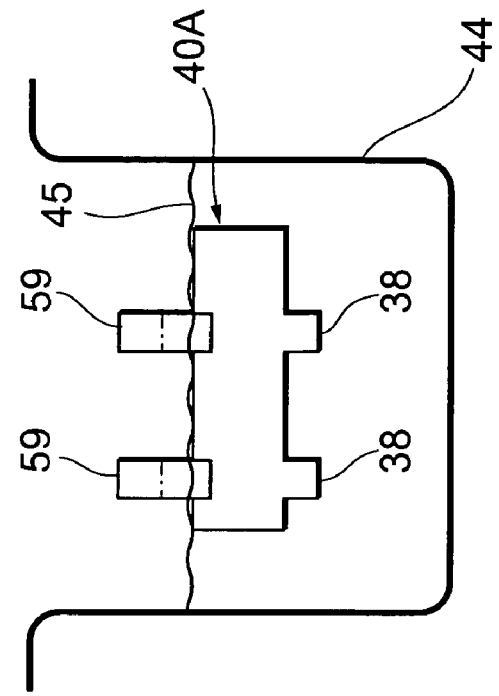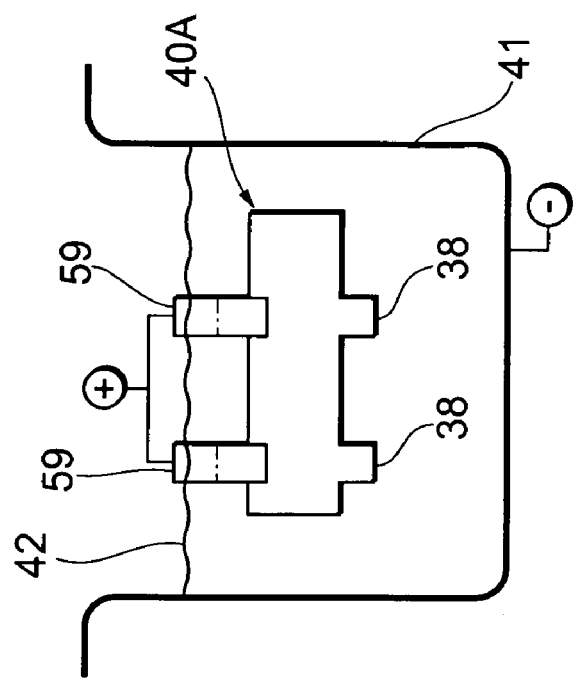

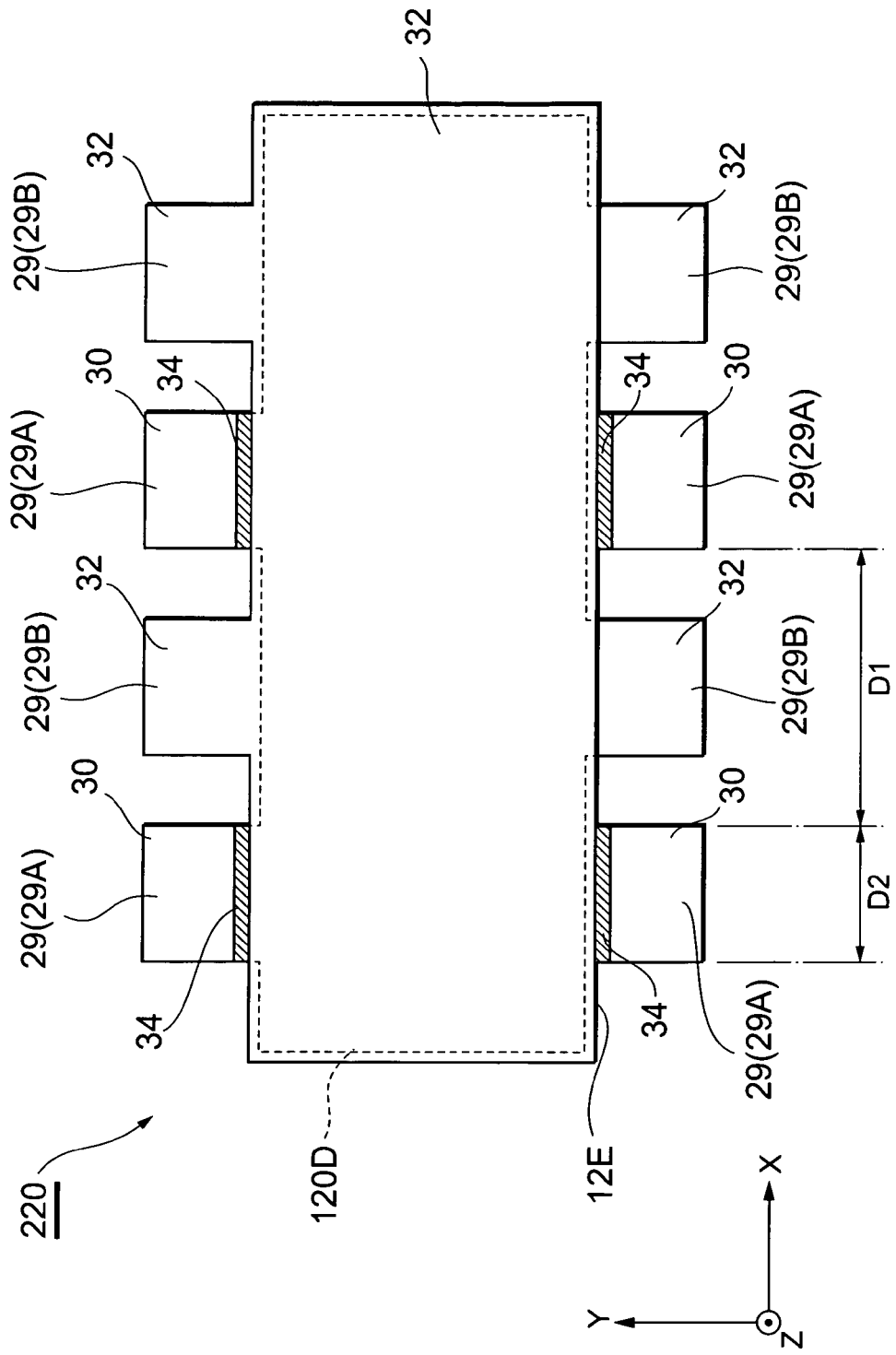

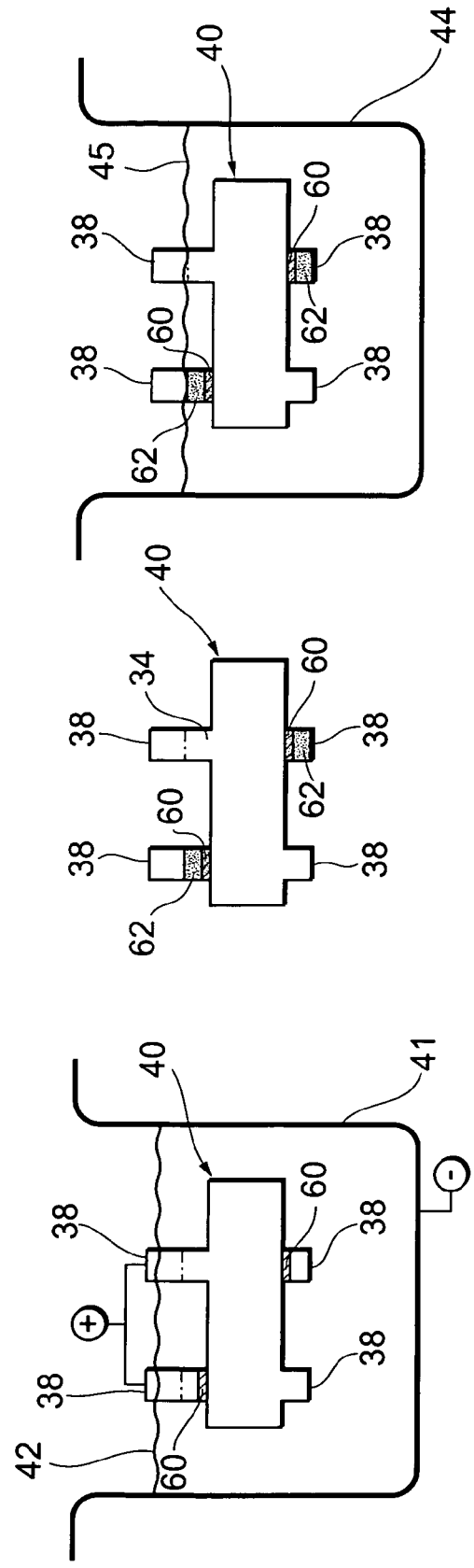

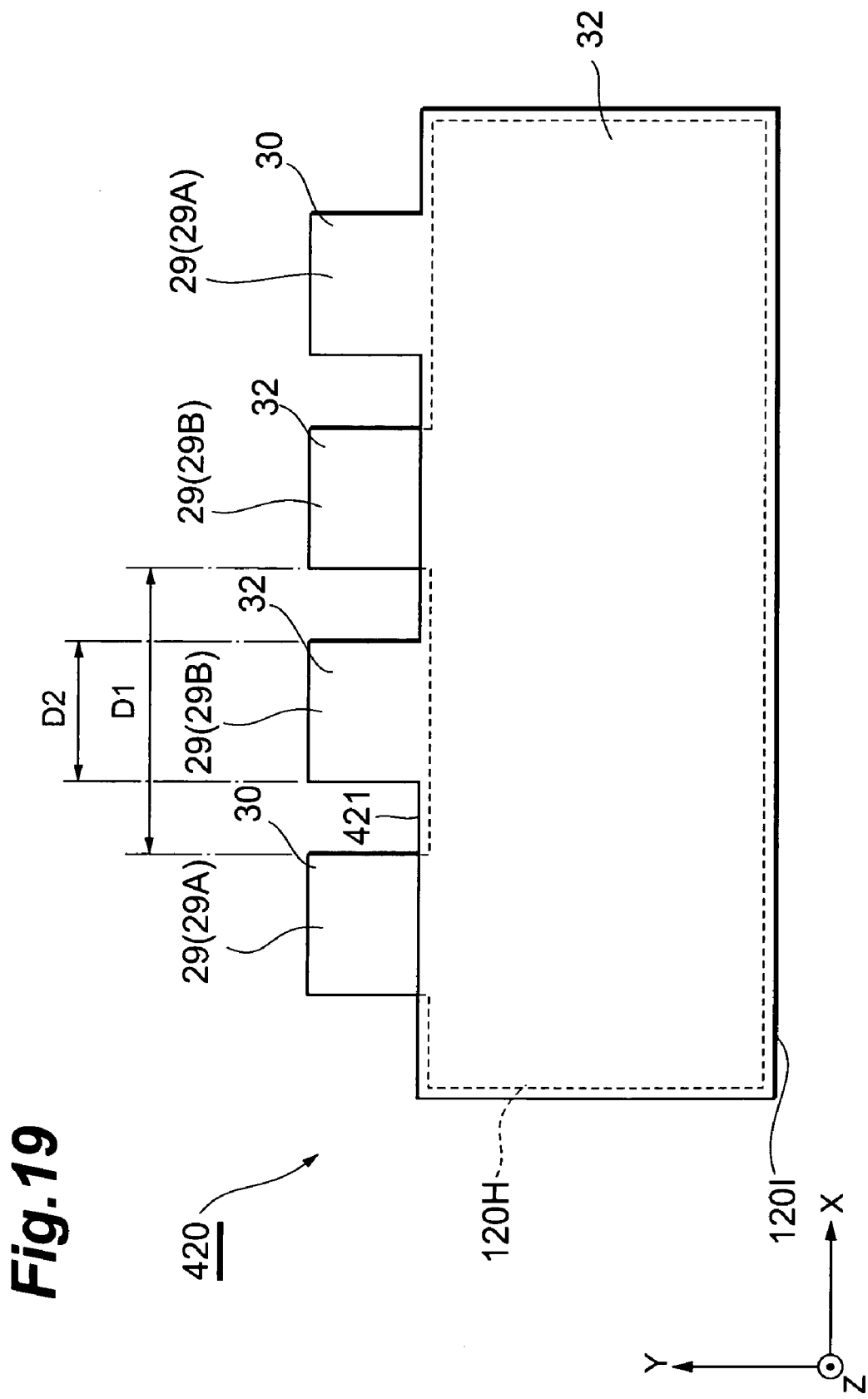

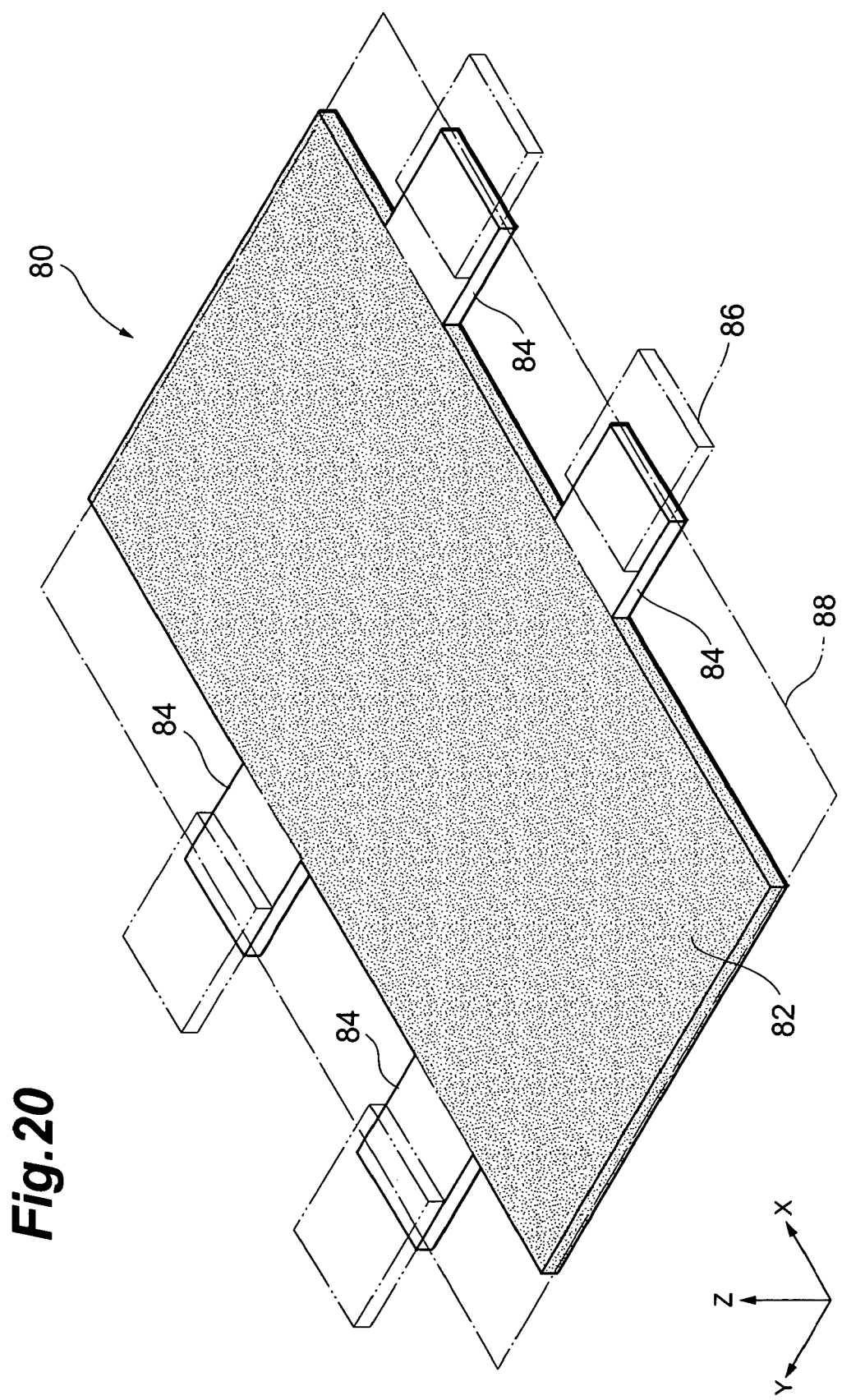

CAPACITOR ELEMENT, SOLID ELECTROLYTIC CAPACITOR, PROCESSES FOR THEIR PRODUCTION AND CAPACITOR ELEMENT COMBINATION

TECHNICAL FIELD

The present invention relates to a capacitor element, a solid electrolytic capacitor, processes for their production and a capacitor element combination.

BACKGROUND ART

Capacitor elements used in solid electrolytic capacitors have conventionally been formed by using metals such as aluminum, titanium, brass, nickel, tantalum or the like, or "valve metals", which are capable of forming insulating oxide films, for the anode, carrying out anodic oxidation of the surface of the valve metal to form an insulating oxide film, and then forming an electrolyte layer essentially functioning as the cathode and providing a conductive layer such as graphite or silver to serve as the cathode. In most cases, as shown in FIG. 20, the capacitor element 80 comprises a thin rectangular accumulator 82 and a plurality of pairs of thin electrodes 84 extending outward from the long sides of the accumulator 82. A capacitor element having such a shape is disclosed, for example, in U.S. Pat. No. 5,880,925. The electrodes 84 are connected by a lead frame (not shown) via connector materials 86. Also, the capacitor element of this publication is intended for use in a laminated ceramic capacitor.

DISCLOSURE OF THE INVENTION

A solid electrolytic capacitor comprising the conventional capacitor element described above has a large electrostatic capacity of about 190 µF relative to its small element size of, for example, about 2 cm×0.8 cm. However, the conventional solid electrolytic capacitor element described above has been associated with the following problems. Specifically, the external dimensions of a capacitor fabricated using the capacitor element must be larger than the dimensions of the rectangle 88 which includes the capacitor element, but in the case of a conventional capacitor element, the dimensions of the rectangle 88 are increased by the extent of outward extension of the electrodes 84 from the sides of the accumulator 82. That is, due to the large difference between the area of the outer dimensions of the capacitor element and the area of the region of the capacitor element actually used for storage, a problem has existed in that it has not been possible to ensure adequate electrostatic capacity commensurate with the outer dimensions of capacitors fabricated using such capacitor elements. It has thus been desirable to develop a technique for increasing electrostatic capacity without enlarging the element size.

It is therefore an object of the present invention to provide a capacitor element, a solid electrolytic capacitor and processes for their production, which can significantly increase electrostatic capacity while maintaining the same dimensional shape, i.e., without increasing the outer dimensions.

The capacitor element of the invention comprises a valve metal base having a shape with plurality of sides, anode sections partially formed at the edge region of at least one side among the plurality of sides in the area on the main surface of the valve metal base, cathode sections comprising a solid electrolyte layer formed on the valve metal base via a dielectric layer and a conductive layer formed on the solid electrolyte layer, which are formed on the remaining regions from the regions on which the anode sections are formed, in the area on the main surface of the valve metal base, and insulating sections which serve as electrical insulation between the anode sections and the cathode sections.

In this capacitor element, the anode sections are partially formed at the edge regions of the sides of the valve metal base. The cathode sections, which are electrically insulated from the anode sections by the insulating sections, are formed on the remaining regions from the regions on which the anode sections are formed. In other words, the anode sections are situated inward from the perimeter of the valve metal base on which the cathode sections are formed. Thus, the external dimensions of the capacitor element are not enlarged by formation of the anode sections. As a result, the area of the capacitor element may be increased, to approach the area of the external dimensions of the capacitor fabricated using the capacitor element. Anode leads are also mounted at each side on which the anode sections are formed, with the direction of extension being perpendicular to the side.

The valve metal base preferably has a roughly square shape, and the anode sections are preferably formed at the edge regions of two opposite sides of the plurality of sides. In this case, an anode lead extends from each anode section formed on the edge regions of the two opposite sides, for separation of the current paths.

Preferably, a plurality of anode sections are formed on the edge region of each side. In this case, an anode lead extends from each of the anode sections formed on the same side, thereby separating the current paths.

Also, at least portions of the insulating sections are preferably formed of insulating members lying between anode and cathode sections. This allows reliable electrical insulation to be achieved between the anode and cathode sections by the insulating members.

In addition, at least portions of the insulating sections are preferably formed by slits provided so as to partition the anode and cathode sections. This allows the air in the gaps of the slits to function as insulating materials, for reliable electrical insulation between the anode and cathode sections.

The valve metal base preferably comprises a first metal body having a plurality of sides with recesses in the edge region of at least one side of the plurality of the sides, and a second metal body connected as an anode section to the periphery of the recesses so as to fill the recesses. This makes it possible to easily achieve electrical insulation between the anode and cathode sections by connecting the second valve metal body to a prescribed location of the first valve metal body, without separately forming insulating members or slits.

The process for production of a capacitor element according to the invention is a process for efficient production of the capacitor element of the invention, comprising a first step of partially forming anode sections at the edge region of at least one side among the plurality of sides in the area on the main surface of a valve metal base having a shape with a plurality of sides, a second step of electrically insulating the anode and cathode sections with insulating sections, and a third step of forming the cathode sections by laminating a solid electrolyte layer and a conductive layer on the remaining regions from the regions on which the anode sections are formed, in the area on the main surface of the valve metal base, via a dielectric layer.

As mentioned above, the valve metal base has a roughly rectangular shape, and in the first step, the anode sections are preferably formed at the edge regions of two opposite sides of the plurality of sides. Also in the first step, a plurality of anode sections are preferably formed at the edge regions of each side.

In the second step, insulating members are situated between the anode and cathode sections as at least portions of the insulating sections, and slits are preferably formed partitioning the anode and cathode sections.

Also in the first step, the valve metal base used is preferably one having a plurality of sides, and comprising a first metal body with recesses in the edge region of at least one side of the plurality of the sides and a second metal body connected as the anode sections to the periphery of the recesses so as to cover the recesses, with the first valve metal body connected to the second valve metal body.

The solid electrolyte capacitor of the invention may also be provided with a capacitor element comprising a valve metal base having a shape with plurality of sides, anode sections partially formed at the edge region of at least one side among the plurality of sides in the area on the main surface of the valve metal base, cathode sections comprising a solid electrolyte layer formed on the valve metal base via a dielectric layer and a conductive layer formed on the solid electrolyte layer, which are formed on the remaining regions from the regions on which the anode sections are formed, in the area on the main surface of the valve metal base, and insulating sections which serve as electrical insulation between the anode sections and the cathode sections, as well as leads connected to the anode and cathode sections.

This solid electrolyte capacitor has enlarged cathode sections of the capacitor element which serves the storage function, without increasing the external dimensions of the capacitor element. As a result, it has a larger electrostatic capacity than that of conventional solid electrolyte capacitors of the same dimensions.

The process for production of a solid electrolyte capacitor according to the invention is a process for efficient production of the solid electrolyte capacitor of the invention, comprising a first step of partially forming anode sections at the edge region of at least one side among the plurality of sides in the area on the main surface of a valve metal base having a shape with a plurality of sides, a second step of electrically insulating the anode and cathode sections with insulating sections, a third step of forming cathode sections by laminating a solid electrolyte layer and a conductive layer on the remaining regions from the regions on which the anode sections are formed, in the area on the main surface of the valve metal base, via a dielectric layer, and a fourth step of connecting leads to the anode and cathode sections.

The capacitor element combination of the invention is composed of a stack of capacitor elements each provided with a valve metal base having a plurality of sides and having a plurality of electrode sections extending from at least one side, anode sections formed on some of the electrode sections among the plurality of electrode sections extending from the valve metal base, cathode sections comprising a solid electrolyte layer formed on the remaining regions from the regions of the electrode sections on which the anode sections are formed, in the area on the main surface of the valve metal base, via a dielectric layer, and a conductive layer formed on the solid electrolyte layer, wherein between electrode sections of one of the capacitor elements there are positioned electrode sections of another of the capacitor elements, and electrode sections having cathode sections formed thereon are positioned on the same side as the electrode sections on which the anode sections are formed.

In this capacitor element combination, a plurality of electrode sections extend from at least one side of the valve metal base of the capacitor element, and anode and cathode sections are formed on the electrode sections. Also, in the capacitor element combination fabricated by stacking the capacitor elements, the electrode sections on which the cathode sections are formed are positioned on the same side as the electrode sections on which the anode sections are formed. Thus, increase in the external dimensions of the capacitor element is avoided even when the electrode sections on which the cathode sections are formed extend outward. It is thereby possible to increase the electrostatic capacity by the extent of the cathode sections formed on the electrode sections, while preventing increase in the external dimensions of the capacitor element combination.

The valve metal base preferably has a rectangular shape, with two electrode sections extending from each of the two opposite sides, wherein anode sections are formed on the two electrode sections extending from one side among the electrode sections, while cathode sections are formed on the two electrode sections extending from the other side. In this case, since the regions on which the anode sections are formed and the regions on which the cathode sections are formed can be separated by a single imaginary line within the area on the surface of the valve metal base, it is possible, for example, to accomplish dip formation of the cathode sections without using a resist.

The electrode sections each preferably extend from positions corresponding to the positions of the electrode sections formed on opposite sides.

Preferably, the first electrode section, which is one of the two electrode sections extending from one side, is located at a position corresponding to the position between two electrode sections extending from the other side, while the other electrode section extending from the one side is located so that the position corresponding to the position between that electrode section and the first electrode section is the position of one of the two electrode sections extending from the other side.

Also preferably, the valve metal base has a rectangular shape, and two electrode sections extend from one side, with anode sections formed on one of the two electrode sections and cathode sections formed on the other. Since in this case the mounting operation is completed by bonding on only one side during mounting of the capacitor element combination on the lead frame, the mounting operation can be simplified.

The solid electrolyte capacitor of the invention is provided with a capacitor element combination composed of a stack of capacitor elements each provided with a valve metal base having a plurality of sides and having a plurality of electrode sections extending from at least one side, anode sections formed on some of the electrode sections among the plurality of electrode sections extending from the valve metal base, cathode sections comprising a solid electrolyte layer formed on the remaining regions from the regions of the electrode sections on which the anode sections are formed, in the area on the surface of the valve metal base, via a dielectric layer, and a conductive layer formed on the solid electrolyte layer, wherein between the electrode sections of one of the capacitor elements there are positioned electrode sections of another capacitor element, and electrode sections having cathode sections formed thereon are positioned on the same side as the electrode sections on which the anode sections are formed, as well as leads connected to the anode and cathode sections.

This solid electrolyte capacitor has its electrostatic capacity increased by the number of cathode sections formed on the electrode sections of the capacitor element combination, without increasing the external dimensions of the capacitor element combination. As a result, the solid electrolyte capacitor can exhibit a large electrostatic capacity while avoiding increase in external dimensions.

The capacitor element of the invention is a capacitor element suitable for a solid electrolyte capacitor, and is provided with a capacitor element composed of a stack of capacitor elements each comprising a valve metal base having a plurality of sides and having a plurality of electrode sections extending from at least one side, anode sections formed on some of the electrode sections among the plurality of electrode sections extending from the valve metal base, cathode sections comprising a solid electrolyte layer formed on the remaining regions from the regions of the electrode sections on which the anode sections are formed, in the area on the surface of the valve metal base, via a dielectric layer, and a conductive layer formed on the solid electrolyte layer, wherein the spacing between adjacent electrode sections is wider than the widths of the electrode sections in the direction along the side of the valve metal base from which the electrode sections extend.

In this capacitor element, a plurality of electrode sections extend from at least one side of the valve metal base, and anode and cathode sections are formed on the electrode sections. Also, since the spacing between adjacent electrode sections is wider than the widths of the electrode sections, the electrode sections can be stacked together without contacting, when two capacitor elements are stacked. Consequently, the capacitor element can be applied in the aforementioned capacitor element combination or solid electrolyte capacitor.

BRIEF DESCRIPTION OF THE DRAWINGS

FIGS. 4A to 4C are illustrations showing a procedure for fabrication of a capacitor element.

FIGS. 7A to 7C are illustrations showing a procedure for fabrication of the capacitor element of FIG. 6.

FIGS. 9A to 9C are illustrations showing a procedure for fabrication of the capacitor element of FIG. 8.

FIG. 11 is a plan view of the capacitor element combination shown in FIG. 10.

FIGS. 12A to 12C are illustrations showing a procedure for fabrication of the capacitor element of FIG. 11.

FIGS. 15A to 15B are illustrations showing a procedure for fabrication of the capacitor element of FIG. 14.

FIG. 16 shows a different mode of a capacitor element combination according to the invention.

FIGS. 18A to 18C are illustrations showing a procedure for fabrication of the capacitor element of FIG. 17.

FIG. 19 shows yet a different mode of a capacitor element combination according to the invention.

FIG. 20 is a perspective view of a capacitor element of the prior art.

BEST MODE FOR CARRYING OUT THE INVENTION

Figure 1:
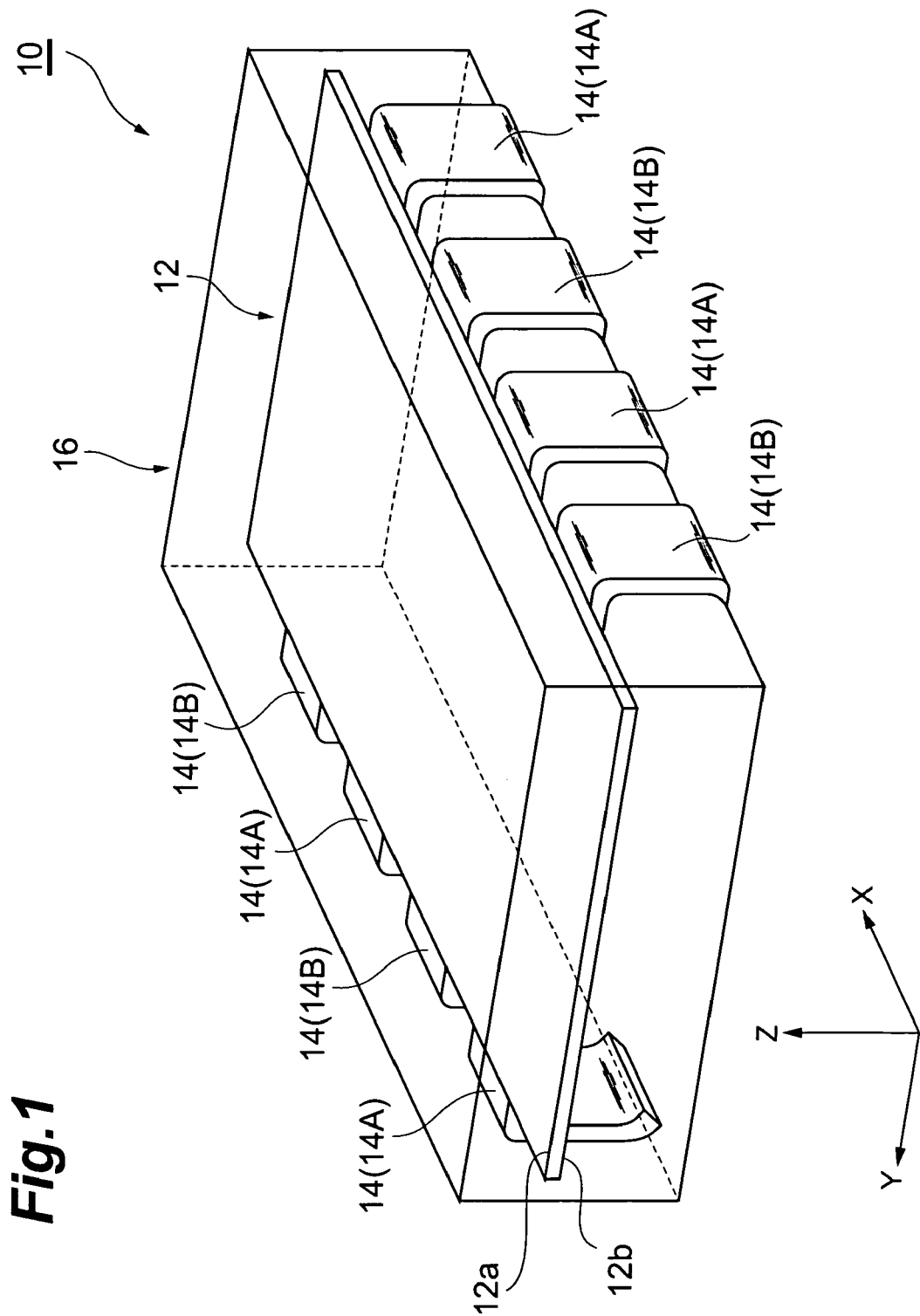
FIG. 1 is a perspective view of an embodiment of a solid electrolytic capacitor according to the invention.

Preferred embodiments of the capacitor element, solid electrolyte capacitor and processes for their production according to the invention will now be explained in greater detail with reference to the accompanying drawings. Identical or corresponding elements will be indicated by like reference numerals, and will be explained only once.

FIG. 1 is a perspective view of an embodiment of a solid electrolytic capacitor 10 according to an embodiment of the present invention. As shown in FIG. 1, the solid electrolyte capacitor 10 comprises a capacitor element 12, eight lead electrodes (leads) 14 on which the capacitor element 12 is mounted, and a resin mold 16 which anchors in a mold the capacitor element 12 and portions of the lead electrodes 14. In this solid electrolyte capacitor 10, power is supplied to the capacitor element 12 via the lead electrodes 14 from a circuit board (not shown) on which the solid electrolyte capacitor 10 is mounted. The lead electrodes 14 include anode leads 14A connected to the anodes on the circuit board and cathode leads 14B connected to the cathode on the circuit board.

Figure 2:
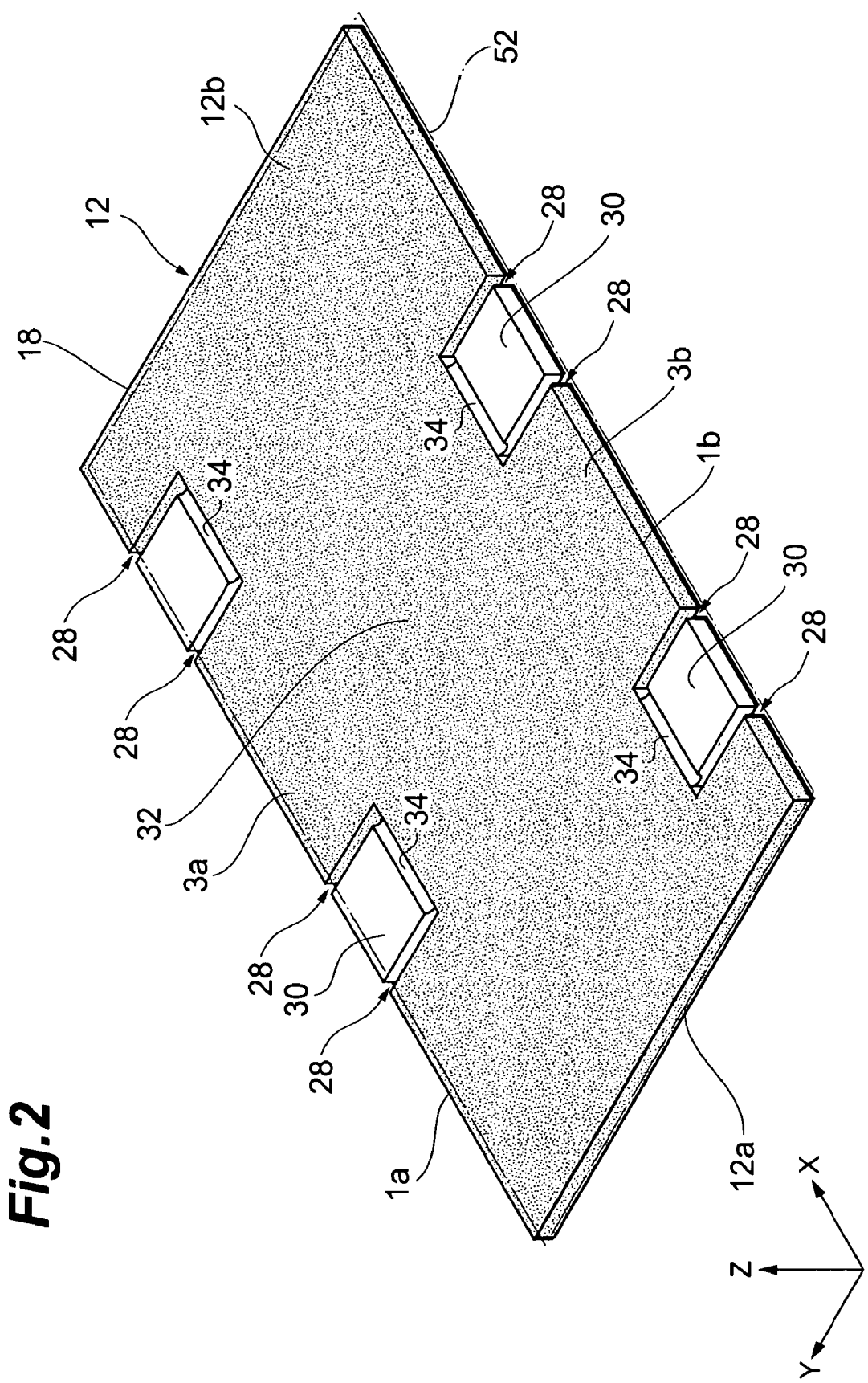
FIG. 2 is a perspective view of the capacitor element shown in FIG. 1.
Figure 3:
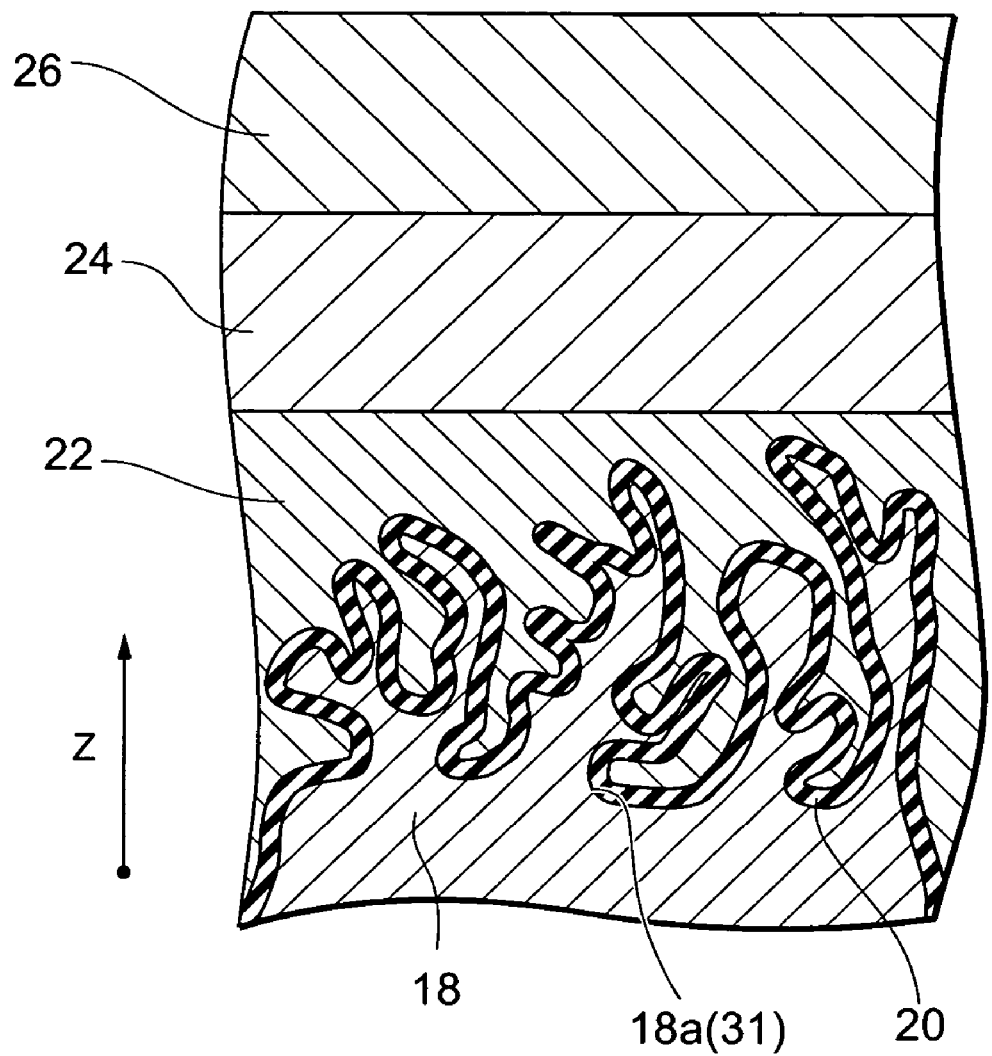
FIG. 3 is a schematic cross-sectional view of the essential part of the capacitor element shown in FIG. 2.

FIG. 2 is a perspective view of the capacitor element 12 shown in FIG. 1. As shown in FIG. 2, the capacitor element 12 comprises a solid polymer electrolyte layer (solid electrolyte layer) and a conductive layer laminated in that order on parts of the area (the regions of the cathode sections described hereunder) of an aluminum base (vale metal base) foil 18 which had been roughened (distended) and chemically treated on the front and back sides 12a, 12b. The state of lamination in these regions will now be explained in detail with reference to FIG. 3. FIG. 3 is a schematic cross-sectional view of the essential part of the capacitor element 12 shown in FIG. 2 (or the capacitor elements 120A,120B shown in FIG. 1 described hereunder). As shown in FIG. 3, the aluminum base 18 (100 μm thickness) which has been roughened by etching has an insulating aluminum oxide film 20 formed on the surface 18a thereof by conversion treatment, i.e. by anodic oxidation. Also, a solid polymer electrolyte layer 22 comprising a conductive polymer compound is formed on the aluminum oxide film 20 so as to fill the recesses of the aluminum base 18. Formation of the solid polymer electrolyte layer 22 is accomplished by filling the recesses of the aluminum base 18 with the conductive polymer in a monomer state, and then performing chemical oxidative polymerization or electrolytic oxidative polymerization.

On the solid polymer electrolyte layer 22 there are formed in order a graphite paste layer 24 and a silver paste layer 26 (conductive layer) by an immersion method (a dipping method). The cathode (cathode sections) of the capacitor element 12 is composed of the aforementioned solid polymer electrolyte layer 22, graphite paste layer 24 and silver paste layer 26. Formation of the graphite paste 24 or silver paste layer 26 is typically carried out by screen printing or spray coating, as necessary.

As shown in FIG. 2, the capacitor element 12 has a roughly rectangular external shape, and slits (insulators) 28 are formed on the edges. For convenience, the long side direction of the external shape of the capacitor element 12 will be referred to as the X direction, the short side direction will be referred to as the Y direction, and the direction orthogonal to the X and Y directions will be referred to as the Z direction.

The slits 28 in the capacitor element 12 are formed as two pairs at the edge regions 3a, 3b of the two opposite sides 1a, 1b of the capacitor element 12, all lying along the Y direction. The positions of the four pairs of slits 28 are in a point symmetrical relationship about the center of gravity of the rectangle as the external shape of the capacitor element. The center of gravity is defined as the point on the surface of the capacitor element 12 where the diagonals of the rectangle cross.

Also, the four sections which are sandwiched by the four pairs of slits 28 in the capacitor element 12 constitute the anode sections 30, while the remaining regions 31 other than the anode sections 30 constitute the cathode sections 32. An aluminum oxide film 20 alone is formed on the aluminum base 18 at the anode sections 30 sandwiched by the pairs of slits. Also, at the cathode sections 32 as mentioned above, a cathode made of the solid polymer electrolyte layer 22, graphite paste layer 24 and silver paste layer 26 is formed on the aluminum oxide film 20 formed on the aluminum base 18. At the sections which are the borders between the anode sections 30 and cathode sections 32 which have been subjected to roughening treatment, there are formed insulating grooves 34 which are broken by compaction of the roughened structure.

A procedure for fabrication of a capacitor element 12 will now be explained with reference to FIG. 4. FIG. 4 is a set of illustrations showing a procedure for fabrication of a capacitor element 12.

First, an aluminum foil 40, having a pair of protrusions 38 extending from the end of one of the two long sides of a rectangular shaped section 36, i.e. one of the long side edges, is cut out from an aluminum foil sheet which has been subjected to roughening and had an aluminum oxide film 20 formed thereon. Next, four pairs of slits 28 are formed at prescribed positions of the rectangular shaped section 36 of the aluminum foil 40. Specifically, two pairs of slits 28 are formed on each edge region of the two long sides of the rectangular shaped section 36. The banded areas (for example, 1 mm wide) connecting the edges of the slits 28 forming pairs in the surface region of the aluminum foil 40 are compacted to break the roughened structure at those sections, thereby forming the insulating grooves 34. The sections surrounded by the pairs of slits 28 and insulating grooves 34 constitute the anode sections 30. Formation of the insulating grooves 34 segments the roughened structure of the aluminum foil 40 into cathode sections 32 and anode sections 30. Thus, during the step of forming the solid polymer electrolyte layer 22 described hereunder, the polymer solution impregnated into the cathode sections 32 can be reliably prevented from penetrating into the anode sections 30 by capillary action.

Next, the ends of the protrusions 38 are supported while the rectangular shaped section 36 of the aluminum foil 40 is immersed into the conversion solution 42 housed in a stainless steel beaker 41 (see FIG. 4A). A voltage is then applied to the conversion solution 42 with the supported protrusions 38 as plus and the stainless steel beaker 41 as minus. By thus immersing the aluminum foil 40 in the conversion solution 42 (conversion treatment), there is formed an aluminum oxide film 20 on the aluminum base 18 at the ends exposed from the foil sheet upon cutting. Conversion treatment after forming the slits 28 forms an aluminum oxide film 20 also on the ends of the slit 28 sections. The conversion solution 42 is preferably a 3 wt % aqueous ammonium adipate solution, for example. The voltage for the conversion treatment may be appropriately selected depending on the desired film thickness for the aluminum oxide film, and will normally be from a few volts to about 20 volts for formation of an aluminum oxide film 20 with a film thickness of 10 nm to 1 µm.

After the conversion treatment, a thermosetting resist 43 is formed over the entire surface including the ends of the portions serving as the anode sections 30 sandwiched by the slits 28 (see FIG. 4B). Also, the aluminum foil 40 is immersed in a polymer solution 45 housed in a beaker 44 for chemical oxidative polymerization (or electrolytic oxidative polymerization), to form a solid polymer electrolyte layer 22 on the surface of the aluminum foil 40 (see FIG. 4C).

Here, since the irregularities on the surface of the roughened aluminum foil 40 are minute, it is difficult to densely form the resist 43 without gaps on the roughened surface. Consequently, the solid polymer electrolyte layer 22 is sometimes formed even in the regions covered by the resist 43 due to capillary action in the areas with the roughened structure. When this occurs, as explained above, insulating grooves 34 resulting from the broken roughened structure are formed at the borders between the anode sections 30 and cathode sections 32, thereby preventing the polymer solution 45 from penetrating into the anode section 30 regions from the cathode section 32 regions on which the solid polymer electrolyte layer 22 is formed. That is, the insulating grooves 34 function as insulators for insulation between the anode sections 30 and cathode sections 32. As a result, the solid polymer electrolyte layer 22 is not formed at the regions where the resist 43, which is removed by subsequent treatment, is formed, or in other words, at the anode sections 30. In addition, since the aluminum oxide film 20 is also formed at the ends of the aluminum foil 40, shorting between any section of the cathode (solid polymer electrolyte layer) and anode (aluminum base) is inhibited.

A graphite paste layer 24 and silver paste layer 26 are also formed by dipping on the surface of the aluminum foil 40. Finally, the resist 43 is dissolved while the aforementioned protrusions 38 are cut, to obtain the capacitor element 12 shown in FIG. 2. Incidentally, after the solid polymer electrolyte layer 22 has been formed on the surface of the aluminum foil 40, it may be subjected to film repair treatment (aging) by the same method as the conversion treatment described above.

Figure 5:
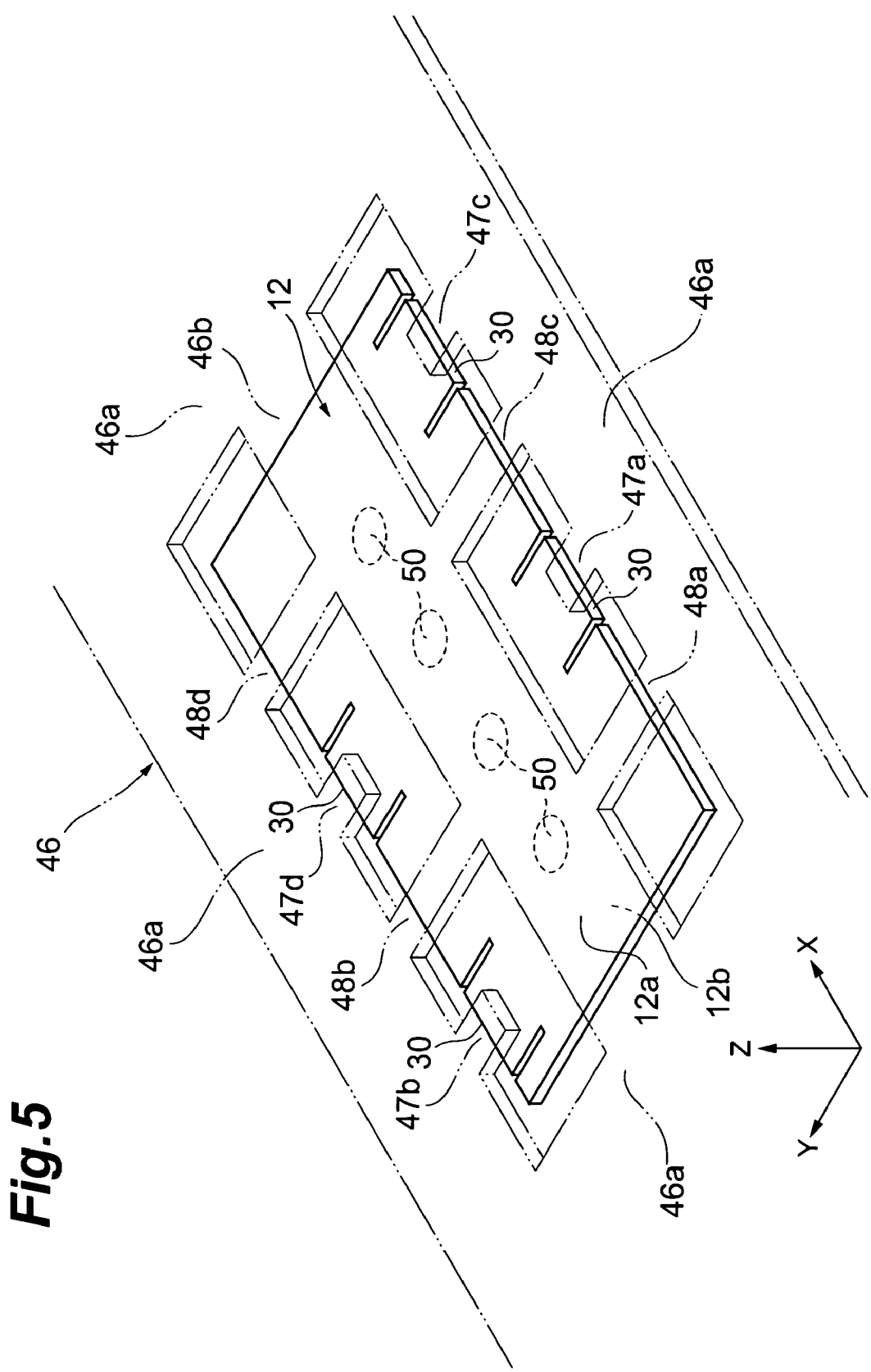
FIG. 5 is a perspective view showing the state of the capacitor element of FIG. 2 mounted on a lead frame.

A process for fabrication of the solid electrolyte capacitor 10 using the capacitor element 12 will now be explained with reference to FIG. 5. FIG. 5 is a perspective view showing the state of the capacitor element 12 of FIG. 2 mounted on a lead frame.

As shown in FIG. 5, the lead frame 46 is obtained by punching a phosphor bronze base into a prescribed shape, onto which the capacitor element 12 is to be mounted. A support section 46b connecting the center of the frame section 46a is provided in the lead frame 46 surrounding the four sides and extending in the X direction of FIG. 5, while four anode lead sections 47a, 47b, 47c, 47d extending from the frame section 46a toward the support section 46b are provided in the orthogonal direction (the Y direction in FIG.

5) with respect to the direction of extension of the support section 46b (the X direction in FIG. 5), and four cathode lead sections 48a, 48b, 48c, 48d connecting the frame section 46a and support section 46b are provided in parallel with prescribed gaps from the anode lead sections 47a, 47b, 47c, 47d.

The capacitor element 12 is mounted in such a manner that the back side (main side) 12b is against the support section 46b of the lead frame 46, and a silver-containing conductive adhesive 50 is used for adhesive anchoring of the support section 46b and the silver paste layer 26 on the underside 12b of the capacitor element 12. The regions of the four anode sections 30 of the capacitor element 12 are placed so as to overlap the ends of the corresponding four anode lead sections 47a, 47b, 47c, 47d, and are welded with a laser spot welding machine. Welding with the laser spot welding machine causes the four anode lead sections 47a, 47b, 47c, 47d to break through the aluminum oxide film 20 formed on the anode sections 30, for electrical connection between the anode sections 30 and the anode lead sections 47a, 47b, 47c, 47d.

Also, the capacitor element 12 anchored on the lead frame 46 is subjected to injection or transfer molding for molding with an epoxy resin. The resin molded capacitor element 12 is cut off from the frame section 46a of the lead frame 46. The anode lead sections 47a, 47b, 47c, 47d are then bent so as to extend orthogonally to the side on which the anode sections 30 are formed, to construct the anode leads 14A shown in FIG. 1. The cathode lead sections 48a, 48b, 48c, 48d are also bent to construct the cathode leads 14B shown in FIG. 1. Thus, the current paths are separated by drawing out the four anode leads 14A and four cathode leads 14B from the capacitor element 12.

As explained in detail above, the anode sections 30 are situated inward from the outer perimeter 52 of the capacitor element 12 having the same shape as the aluminum base 18, and they are formed without extending outward from the capacitor element 12. Thus, the external dimensions of the capacitor element 12 are not enlarged by formation of the anode sections 30. As a result, the surface area of the capacitor element 12 is roughly equivalent to the area of the outer perimeter 52 (the area surrounded by the outer perimeter 52), and since the area of the cathode section 32 provided for storage is larger compared to a conventional capacitor element having the same outer dimensions as this capacitor element 12, the electrostatic capacity of the capacitor element 12 is increased. In addition, since the capacitor element 12 can be designed with greater electrostatic capacity than a conventional capacitor element of the same area, a solid electrolyte capacitor 10 comprising the capacitor element 12 also has increased electrostatic capacity compared to a conventional solid electrolyte capacitor having the same dimensions and shape.

A capacitor element used in the solid electrolyte capacitor 10 described above will now be explained, as a different mode of a capacitor element than the capacitor element 12 described above.

Figure 6:
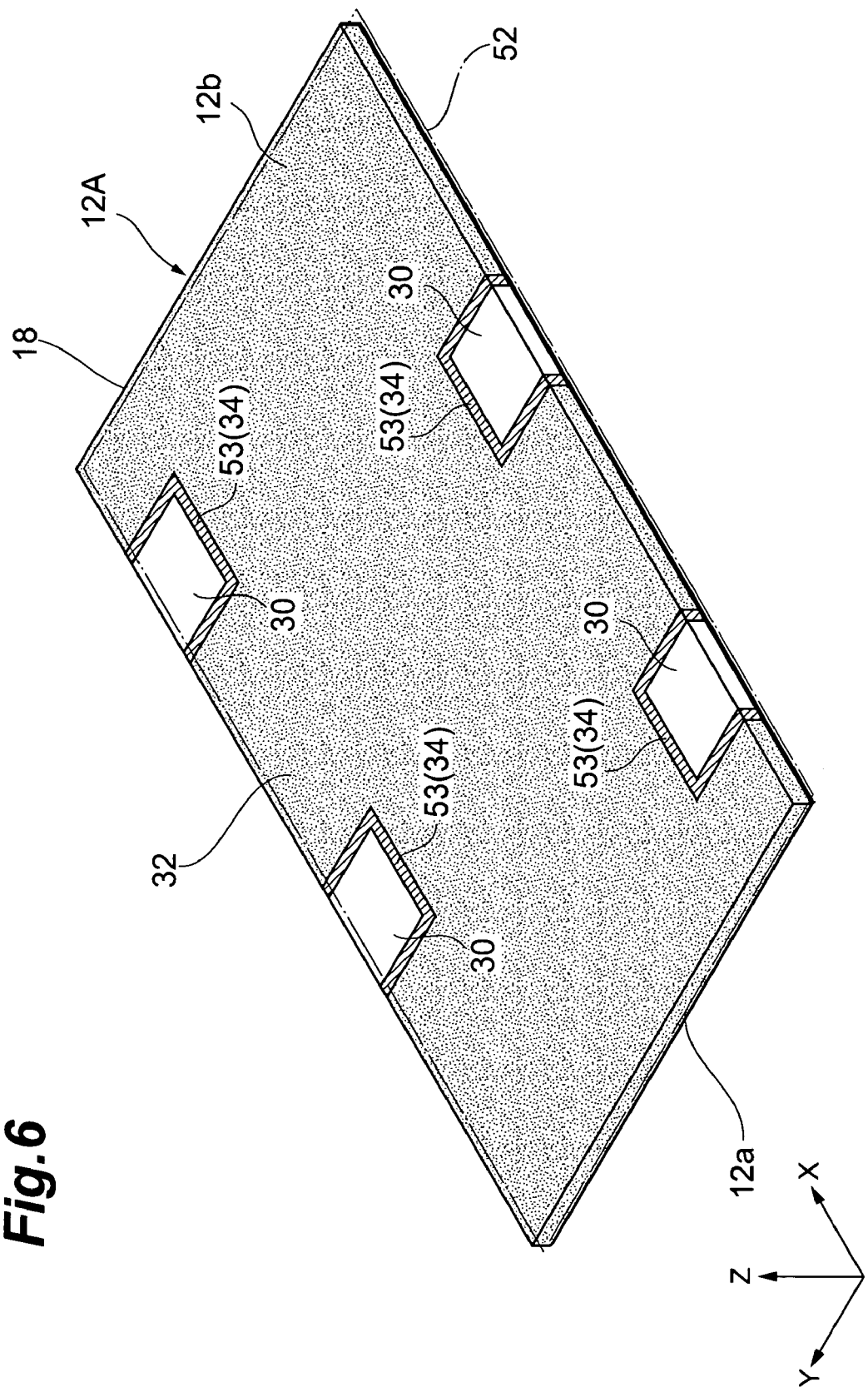
FIG. 6 is a perspective view showing a different mode of a capacitor element according to the invention.

FIG. 6 is a perspective view showing a mode of a capacitor element 12A different from the capacitor element 12. As shown in FIG. 6, this capacitor element 12A differs from the capacitor element 12 described above in that an insulating resin layer 53 is formed instead of the aforementioned slits 28. Specifically, in this capacitor element 12A, the anode sections 30 partially formed on the edge regions are surround on three sides, and an insulating resin layer (insulating member, insulator) 53 made of a silicone resin is formed so as to sandwich the edges corresponding to the anode sections 30. The insulating grooves 34 mentioned above are formed in the regions in which the insulating resin layer 53 is formed, and the silicone resin is coated onto the groove sections. The rest of the method for fabricating this capacitor element 12A will now be explained with reference to FIG. 7.

First, an aluminum foil 40 is prepared as for fabrication of the capacitor element 12 shown in FIG. 4. Also, the roughened structure is broken at about a 1 mm width, for example, so as to surround the regions serving as the anode sections 30 during molding of the aluminum foil 40 into the capacitor element 12A, to form the insulating grooves 34. The resist 43 coats the regions serving as the anode sections 30 and their edges (see FIG. 7A). Conversion treatment is carried out by the same method as described above, with the resist 43 coated onto the anode sections 30 (see FIG. 7B). Next, polymerization treatment is carried out by the same method as described above, with the resist 43 coated onto the anode sections 30, to form a solid polymer electrolyte layer 22 (see FIG. 7C). A graphite paste layer 24 and silver paste layer 26 are formed on the surface of the aluminum foil 40 by dipping. Finally, the resist 43 is dissolved and the protrusions 38 are cut. In this mode as well, as was explained above, the insulating grooves 34 prevent penetration of the polymerization solution 45 from the regions of the cathode sections 32 into the regions of the anode sections 30.

Since the anode sections 30 which have not been subjected to conversion treatment are exposed in this state, shorting can easily occur between the anode sections 30 and cathode sections 32 during power supply to the capacitor element 12A. In the capacitor element 12, therefore, an insulating resin layer 53 made of a silicone resin is formed near the boundaries between the anode sections 30 and cathode sections 32, for electrical insulation between the anode sections 30 and cathode sections 32. The capacitor element 12A is obtained in this manner. According to this method for fabrication of the capacitor element 12A, the resist 43 is formed on the anode sections 30 before conversion treatment of the aluminum foil 40, and therefore electrical connection can be established by simple contact between the anode sections 30 and the anode lead sections 47a, 47b, 47c, 47d during connection between the anode sections 30 and the anode lead sections 47a, 47b, 47c, 47d of the lead frame 46, without using a bonding machine such as a laser spot welding machine. Connection between the anode sections 30 and the anode lead sections 47a, 47b, 47c, 47d therefore becomes easier and more convenient.

The explanation above is for a mode wherein the insulating resin layer 53 is formed after forming the solid polymer electrolyte layer 22, graphite paste layer 24 and silver paste layer 26, but alternatively, for example, the resist 43 may be formed on the anode section 30 portions after forming the insulating grooves 34 so as to surround the sections serving as the anode sections 30, the insulating resin layer 53 subsequently formed thereover, and then polymerization treatment or the like carried out to form the solid polymer electrolyte layer 22, graphite paste layer 24 and silver paste layer 26. When the resist 43 or insulating resin layer 53 are formed in a dense manner to prevent infiltration of the polymerization solution 45 into the anode section 30 portions, there may be no need to form the insulating grooves 34 breaking the roughened structure. In such cases, the aluminum oxide film 20 formed on the anode sections 30 functions as the insulating sections.

As explained above, this capacitor element 12A, like the capacitor element 12, has the anode sections 30 positioned inward from the outer perimeter 52 of the capacitor element 12A which has the same shape as the aluminum base 18, and they are formed without extending outward from the capacitor element 12A. Thus, the surface area of the capacitor element 12A is roughly equal to the area of the outer perimeter 52, and since the area of the cathode sections 32 provided for storage is larger compared to a conventional capacitor element having the same outer dimensions as this capacitor element 12A, the electrostatic capacity of the capacitor element 12A is increased.

Figure 8:
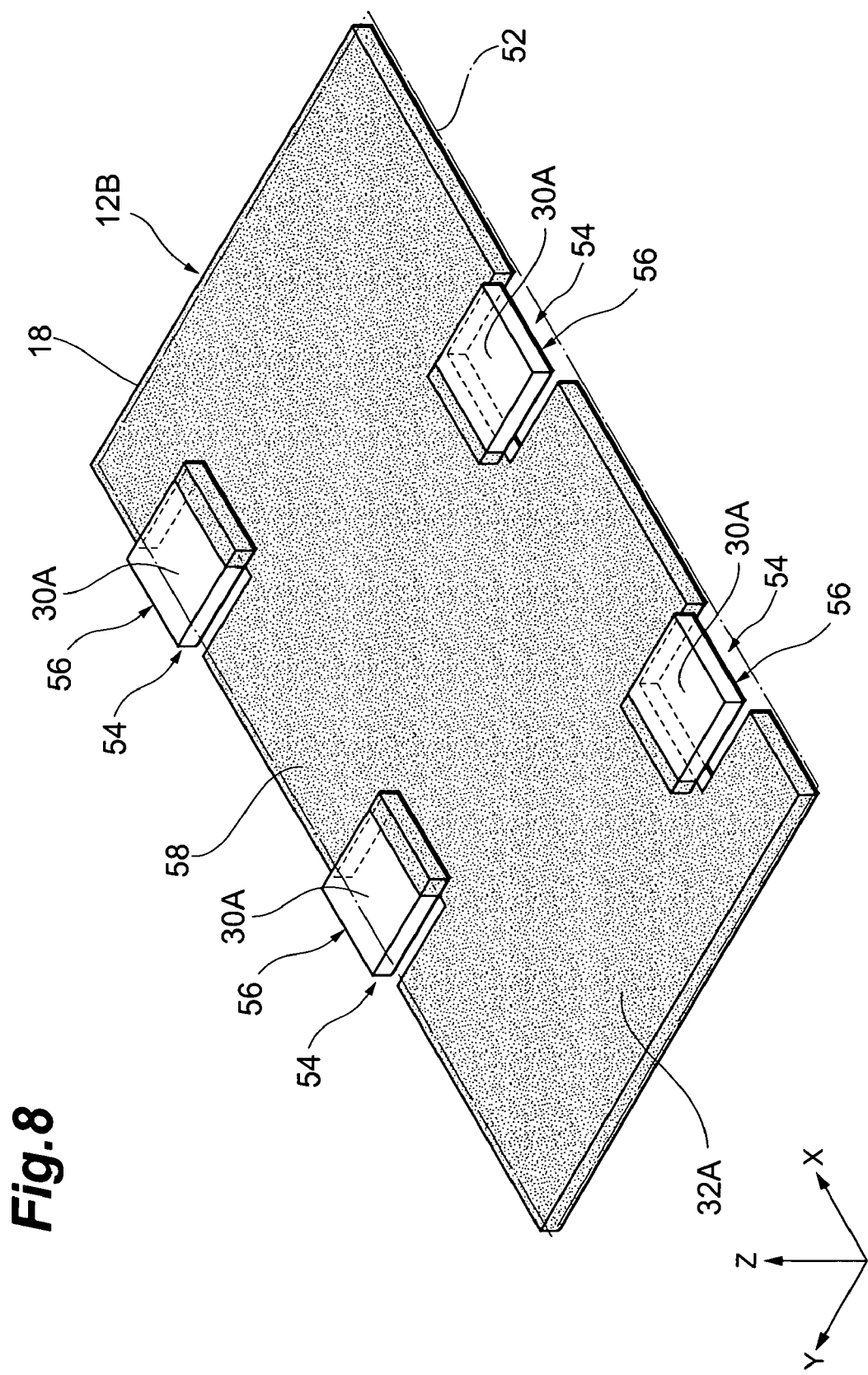
FIG. 8 is a perspective view of yet another mode of a capacitor element according to the invention.

FIG. 8 is a perspective view of another mode of a capacitor element 12B, different from the capacitor element 12. As shown in FIG. 8, the capacitor element 12B differs from the capacitor element 12 described above only in that it is composed of two members. Specifically, the capacitor element 12B has square notches (recesses) 54 formed at the anode section 30 portions described above. Anode foils (second valve metal body) 56 are connected to the edge regions extending in the X direction, which are at the circumferences of the notches 54 on the face of the capacitor element 12B, by ultrasonic welding. The anode foil 56 is cut from a non-roughened aluminum foil sheet, and is electrically connected to the aluminum base 18. Also, the portions of the anode foil 56 where the cathode is not formed constitute the anode sections 30A, while the regions other than the anode sections 30A constitute the cathode sections 32A on which the cathode (the solid polymer electrolyte layer 22, graphite paste layer 24 and silver paste layer 26 shown in FIG. 3) is formed.

A procedure for fabrication of this capacitor element 12B will now be explained with reference to FIG. 9. The aluminum foil 40A used to fabricate the capacitor element 12B is composed of four anode foils 56 cut from a non-roughened aluminum foil sheet, and a foil (first valve metal body) 57 cut from a non-roughened aluminum foil sheet with notches in the regions corresponding to the positions on which the anode foils 56 are to be mounted. Also, the ends of the anode foils 56 are supported on one side of the aluminum foil 40A and are subjected to conversion treatment by the same method as described above (see FIG. 9A). This results in formation of an aluminum oxide film 20 on the ends of the foil 57 containing the notches 54 and on the dipped portions of the anode foils 56.

After the conversion treatment, a thermosetting resist 43 is formed as a film covering the portions which serve as the anode sections 30A (see FIG. 9B). Polymerization treatment is carried out by the same method as described above, with the resist 43 coated on the anode sections 30A, to form a solid polymer electrolyte layer 22 on the surface of the aluminum foil 40A (see FIG. 9C). A graphite paste layer 24 and silver paste layer 26 are formed by dipping on the surface of the polymer electrolyte layer 22 on the aluminum foil 40A. Finally, the resist 43 is dissolved while the extending portions of the anode foils 56 are cut, to obtain a capacitor element 12B.

In this capacitor element 12B, a part of the aluminum oxide film formed on the surface of the anode sections 30A functions as an insulating section which insulates the anode sections 30A and cathode sections 32A.

In this capacitor element 12B, as explained above, has the anode sections 30A positioned inward from the outer perimeter 52 of the capacitor element 12B, and they are formed without extending outward from the capacitor element 12B, similar to the capacitor element 12 and capacitor element 12A. Thus, the surface area of the capacitor element 12B is roughly equal to the area of the outer perimeter 52, and since the area of the cathode sections 32A provided for storage is larger compared to a conventional capacitor element having the same outer dimensions as this capacitor element 12B, the electrostatic capacity of the capacitor element 12B is increased. Incidentally, it is possible to easily achieve electrical insulation between the anode sections 30A and cathode sections 32A in the capacitor element 12B without separately forming slits or an insulating resin layer.

The present invention is not limited to the embodiments described above, and may instead be constructed in the following modes. For example, the method of insulating the anode sections 30 from the cathode sections 32 is not limited to the method described above, and may instead be a mode wherein slits, insulating grooves, an insulating resin layer and an aluminum oxide film are used as appropriate, either alone or in combination. That is, the insulating sections may have a construction wherein the anode sections 30 and cathode sections 32 are simply isolated physically, or they may have a construction provided with insulating members made of an insulating resin for an increased insulating property.

The present invention may also incorporate various modifications, without limitation to the embodiments described above. For example, although aluminum is used as the material for the valve metal base, the valve metal base may alternatively be formed of an aluminum alloy, or tantalum, titanium, niobium, zirconium or an alloy thereof, instead of aluminum. Also, the outer shape of the capacitor element is not restricted to a rectangular shape, and may instead be square, triangular or polygonal, or a curved shape. The anode sections and leads of the capacitor element may also be integrally formed.

Figure 10:
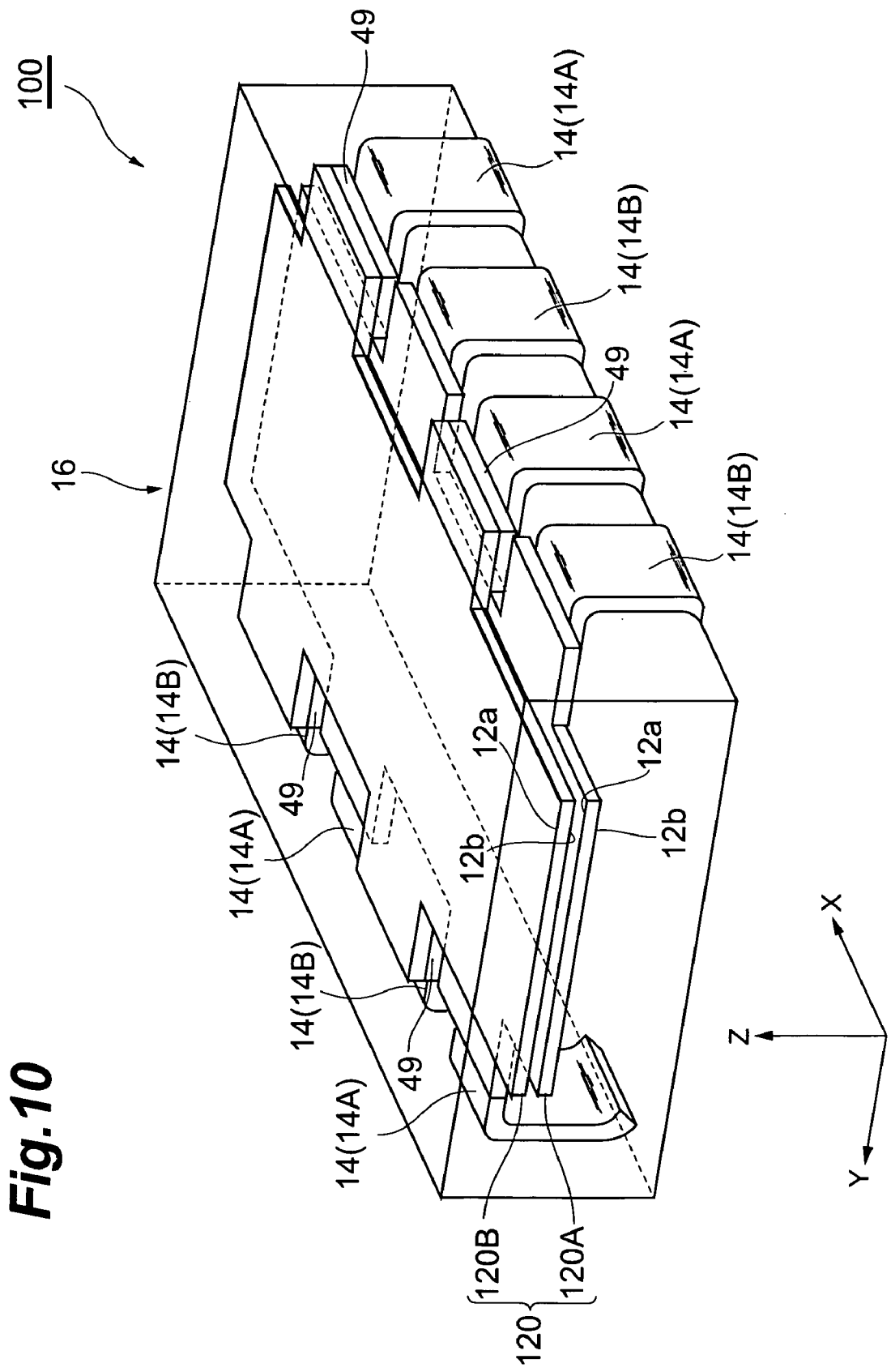
FIG. 10 is a schematic perspective view of another embodiment of a solid electrolyte capacitor according to the invention.

FIG. 10 is a perspective view of second embodiment of a solid electrolyte capacitor according to the invention. As shown in FIG. 10, the solid electrolyte capacitor 100 comprises a capacitor element combination 120 comprising a capacitor element 120A and capacitor element 120B in a stack, eight lead electrodes (leads) 14 on which the capacitor element combination 120 is mounted, and a resin mold 16 which anchors in a mold the capacitor element combination 120 and portions of the lead electrodes 14. In this solid electrolyte capacitor 100, power is supplied to the capacitor element combination 120 via the lead electrodes 14 from a circuit board (not shown) on which the solid electrolyte capacitor 100 is mounted. The lead electrodes 14 include anode leads 14A connected to the anodes on the circuit board and cathode leads 14B connected to the cathode on the circuit board.

The pair of capacitor elements 120A, 120B of the capacitor element combination 120 have a solid polymer electrolyte layer (solid electrolyte layer) and a conductive layer laminated in that order at partial regions on an foil-like aluminum base (valve metal base) having the back sides $12a$, $12b$ roughened (distended) and chemically treated (the regions of the cathode sections described hereunder). The laminated state at these regions will now be explained in detail with reference to FIG. 3.

As shown in FIG. 3, the aluminum base 18 (100 μm thickness) which has been roughened by etching has an insulating aluminum oxide film (dielectric layer) 20 formed on the surface $18a$ thereof by conversion treatment, i.e. by anodic oxidation. Also, a solid polymer electrolyte layer 22 comprising a conductive polymer compound is formed on the aluminum oxide film 20 so as to fill the recesses of the aluminum base 18. Formation of the solid polymer electrolyte layer 22 is accomplished by filling the recesses of the aluminum base 18 with the conductive polymer in a monomer state, and then performing chemical oxidative polymerization or electrolytic oxidative polymerization.

On the solid polymer electrolyte layer 22 there are formed in order a graphite paste layer 24 and a silver paste layer 26 (conductive layer) by a dipping method. The cathode (cathode sections) of the capacitor element 120 is composed of the aforementioned solid polymer electrolyte layer 22, graphite paste layer 24 and silver paste layer 26. Formation of the graphite paste 24 or silver paste layer 26 is typically carried out by screen printing or spray coating, as necessary.

A capacitor element combination 120 will now be explained with reference to FIG. 11. FIG. 11 is a plan view of the capacitor element combination 120. Both the capacitor element 120A and capacitor element 120B of the capacitor element combination 120 have roughly rectangular external shapes, and two electrode sections 29 extend from each of the corresponding long sides 33a,33b. The electrode sections 29 extend from the positions corresponding to the electrode sections 29 formed on the corresponding sides 33a,33b. For convenience, the long side direction of the capacitor element 120A and capacitor element 120B will be referred to as the X direction, the short side direction will be referred to as the Y direction, and the direction orthogonal to the X and Y directions will be referred to as the Z direction.

First, the capacitor element 120A as the capacitor element 120 situated on the lower side of the solid electrolyte capacitor 100 will be explained. Anode sections 30 are formed on two electrode sections 29 extending from one of the long sides 35a of the electrode sections 29 of the capacitor element 120A. Also, cathode sections 32 are formed in the remaining regions 31 other than the regions on which the anode sections 30 are formed in the surface region of the capacitor element 120A. That is, cathode sections 32 are formed on the rectangular portions and on the portions of the electrode sections 29 of the long side 35b opposite the long side 35a of the electrode section 29 sides on which the anode sections 30 are formed.

Only an aluminum oxide film 20 is formed on the aluminum base 18 at the anode sections 30. However, at the cathode sections 32, a cathode comprising a solid polymer electrolyte layer 22, graphite paste layer 24 and silver paste layer 26 is also formed on the aluminum oxide film 20 formed on the aluminum base 18, as explained above. An insulating resin layer 34 made of a silicone resin is formed at a width of about 1 mm near the boundaries between the anode section 30 regions and cathode section 32 regions. For convenience in the following explanation, the electrodes 29 on which the anode sections 30 are formed will be referred to as anodes 29A and the electrodes 29 on which the cathode sections 32 are formed will be referred to as cathodes 29B.

A procedure for fabrication of the capacitor element 120A will now be explained with reference to FIG. 12. FIG. 12 is a set of illustrations showing a procedure for fabrication of the capacitor element 120A.

First, an aluminum foil 40, having a pair of protrusions 38 extending from the two opposite long sides of a rectangular shape is cut out from an aluminum foil sheet which has been subjected to roughening and had an aluminum oxide film 20 formed thereon. The ends of the protrusions 38 formed on one long side are supported while the aluminum foil 40 is immersed into the conversion solution 42 housed in a stainless steel beaker 41 (see FIG. 12A). A voltage is then applied to the conversion solution 42 with the supported protrusions 38 as plus and the stainless steel beaker 41 as minus. By thus performing conversion treatment of the aluminum foil 40 with the conversion solution 42, there is formed an aluminum oxide film 20 on the ends of the aluminum base 18 exposed upon cutting from the foil sheet.

The conversion solution 42 is preferably a 3 wt % aqueous ammonium adipate solution, for example. The voltage for the conversion treatment may be appropriately selected depending on the desired film thickness for the aluminum oxide film, and will normally be from a few volts to about 20 volts for formation of an aluminum oxide film 20 with a film thickness of 10 nm to 1 μm.

After the conversion treatment, an insulating resin layer 34 is coated at the boundaries of the portions serving as the anode section 30 regions and the portions serving as the cathode section 32 regions, at the bases of the protrusions 38 on the side supported on the aluminum foil 40 (see FIG. 12B). The section of the aluminum foil 40 below the insulating resin layer 34 is immersed in a polymer solution 45 housed in a beaker 44 for chemical oxidative polymerization (or electrolytic oxidative polymerization) (see FIG. 12C). This forms a solid polymer electrolyte layer 22 on the cathode regions 32 on the surface of the aluminum foil 40.

Since the insulating resin layer 34 is coated at the boundaries of the portions serving as the anode section 30 regions and the portions serving as the cathode section 32 regions, the polymer solution 45 can be prevented from penetrating from the roughened structure areas of the cathode section 32 regions into the roughened structure areas of the anode section 30 regions by capillary action during the oxidative polymerization. Consequently, the solid polymer electrolyte layer 22 is not formed in the anode section regions. Also, since the aluminum oxide film 20 is also formed at the ends of the aluminum foil 40, shorting between the cathodes (solid polymer electrolyte layer, etc.) and cathodes (aluminum base) is prevented. In addition, since the anode section 30 regions and cathode section 32 regions can be separated by a single imaginary line in an area on the surface of the aluminum foil 40, it is possible to dip only the cathode section 32 regions in the polymer solution 45, etc. for the oxidative polymerization. This allows the cathodes 32 to be formed without using a resist.

A graphite paste layer 24 and silver paste layer 26 are also formed by dipping on the surface of the aluminum foil 40, in the region on which the solid polymer electrolyte 22 is formed. Finally, portions of the protrusions 38 are cut off to obtain the capacitor element 120A shown in FIG. 11. Incidentally, after the solid polymer electrolyte layer 22 has been formed on the surface of the aluminum foil 40, it may be subjected to film repair treatment (aging) by the same method as the conversion treatment described above.

The capacitor element 120B shown in FIG. 11 is an element obtained by the same process used for production of the capacitor element 120A, and it has the same construction as the capacitor element 120A. Also, the capacitor element 120B is stacked on the capacitor element 120A via a conductive adhesive, being rotated 180° around the Z axis with respect to the capacitor element 120A. Consequently, the anodes 29A and cathodes 29B of the capacitor element 120A, and the anodes 29A and cathodes 29B of the capacitor element 120B, are in a point symmetrical positional relationship with respect to the center of gravity of the capacitor element 120A (or capacitor element 120B). Also, the capacitor element 120A and capacitor element 120B both have spacing (D1) between the electrodes 29B which is wider than the spacing (D2) between the electrodes 29A in the X direction. In addition, the positions of the electrodes 29 of the capacitor element 120A and capacitor element 120B are adjusted so that when the capacitor element 120B is stacked on the capacitor element 120A, the electrodes 29 of the capacitor element 120B are positioned between the electrodes 29 of the capacitor element 120A. Incidentally, in all of the capacitor elements described hereunder, the spacing (D1) between the electrodes 29B is wider than the spacing (D2) between the electrodes 29A in the X direction.

Thus, when the capacitor element combination 120 is seen flat as shown in FIG. 11, the cathodes 29B of the capacitor element 120B are positioned on the same side as the anodes 29A of the capacitor element 120A, while the anodes 29A of the capacitor element 120B are positioned on the same side as the cathodes 29B of the capacitor element 120A, each separated by a prescribed distance. Also, the anodes 29A of the capacitor element 120A and the cathodes 29B of the capacitor element 120B on one long side of the capacitor element combination 120 are alternately aligned while the cathodes 29B of the capacitor element 120A and the anodes 29A of the capacitor element 120B on the other long side of the capacitor element combination 120 are alternately aligned, so that no contact between the electrodes 29 occurs.

A process for fabrication of a solid electrolyte capacitor 100 using the capacitor element combination 120 described above will now be explained with reference to FIG. 13.

Figure 13:
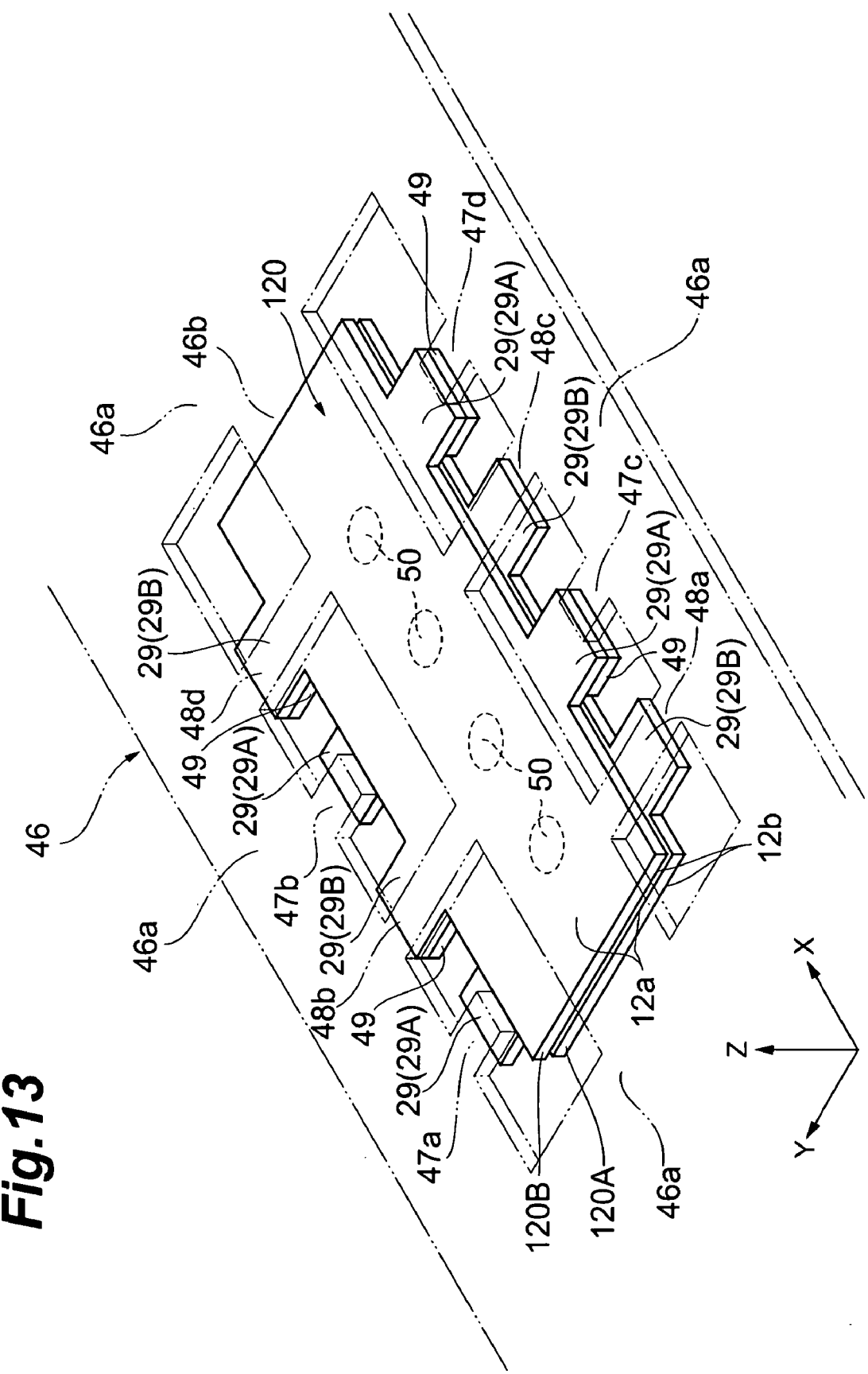
FIG. 13 is a perspective view showing the capacitor element combination of FIG. 11 mounted on a lead frame.

As shown in FIG. 13, the lead frame 46 is obtained by punching a phosphor bronze base into a prescribed shape, onto which the capacitor element combination 120 is to be mounted. A support section 46b connecting the center of the frame section 46a is provided in the lead frame 46 surrounding the four sides and extending in the X direction of FIG. 13, while four anode lead sections 47a, 47b, 47c, 47d extending from the frame section 46a toward the support section 46b are provided in the orthogonal direction (the Y direction in FIG. 13) with respect to the support section 46b, and four cathode lead sections 48a, 48b, 48c, 48d connecting the frame section 46a and support section 46b are provided in parallel with prescribed gaps from the anode lead sections 47a, 47b, 47c, 47d.

The capacitor element combination 120 is mounted on the support section 46b of the lead frame 46 in such a manner that the back side 12b of the capacitor element 120A is opposite it, and a silver-containing conductive adhesive 50 is used for adhesive anchoring of the silver paste layer 26 on the uppermost layer of the back side 12b of the capacitor element 120A, and the support section 46b. The two anodes 29A of the capacitor element 120A are placed so as to overlap the ends of the two corresponding anode lead sections 47a, 47b, and are welded with a laser spot welding machine. Also, the two anodes 29A of the capacitor element 120B are stacked on the ends of the two corresponding anode lead sections 47c, 47d via aluminum strips 49, and are welded with a laser spot welding machine. Welding with the laser spot welding machine causes the breakage through the aluminum oxide film 20 formed on the anodes 29A, for electrical connection between the anodes 29A and the anode lead sections 47a, 47b, 47c, 47d.

Also, the capacitor element combination 120 anchored on the lead frame 46 is subjected to injection or transfer molding for molding with an epoxy resin. The resin molded capacitor element combination 120 is cut off from the lead frame 46. The anode lead sections 47a, 47b, 47c, 47d are then bent so as to extend orthogonally to the side on which the anodes 29A are formed, to construct the anode leads 14A shown in FIG. 10. The cathode lead sections 48a, 48b, 48c, 48d are also bent to construct the cathode leads 14B shown in FIG. 10. Thus, the current paths are separated by drawing out the four anode leads 14A and four cathode leads 14B from the capacitor element combination 120.

As explained in detail above, this solid electrolyte capacitor 100 has each of the cathodes 29B of the capacitor element combination 120 positioned on the same side as the anodes 29A. Also, there is no difference in the external dimensions of the capacitor elements 120A, 120B whether the cathodes 29B are formed or not formed on the capacitor elements 120A, 120B. In addition, since cathode sections 32 are formed on the cathodes 29B and the cathodes 29B have a storage function, the capacitor element 120A and capacitor element 120B have increased electrostatic capacity over capacitor elements without cathodes 29B, to the extent of the capacity of the cathodes 29B. In other words, in this capacitor element combination 120, the electrostatic capacity is increased by the capacity of the cathode sections 32 formed on the cathodes 29B, without changing the external dimensions. The solid electrolyte capacitor 100 employing a capacitor element combination 120 having increased electrostatic capacity without changing the external dimensions can also have increased electrostatic capacity without changing the external dimensions of the solid electrolyte capacitor 100. In addition, the parallel positioning of the anodes 29A and cathodes 29B of the capacitor elements 120A, 120B cancels out the magnetic field generated by the current when current flows through the capacitor elements 120A, 120B, to thereby allow reduced equivalent series inductance (ESL).

Different modes of the capacitor element, capacitor element combination and solid electrolyte capacitor described above will now be explained with reference to the accompanying drawings.

Figure 14:
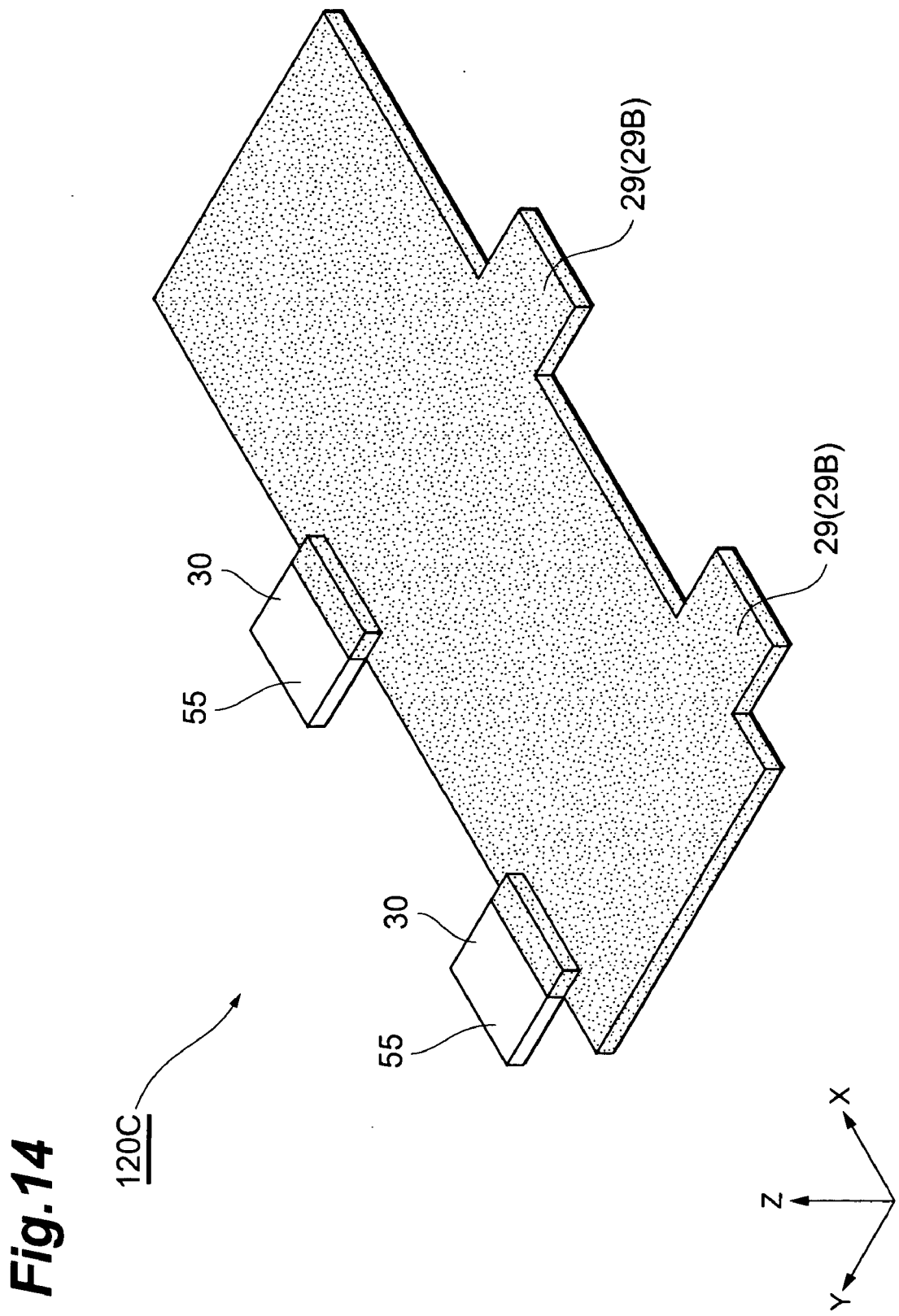
FIG. 14 is a schematic perspective view of a different mode of a capacitor element according to the invention.

FIG. 14 is a schematic perspective view of a capacitor element different from the aforementioned capacitor elements 120A, 120B. The capacitor element 120C shown in FIG. 14 differs from the capacitor elements 120A, 120B described above only in that the aforementioned anodes are separate members. Specifically, in this capacitor element 120C, electrode strips 55 are mounted by ultrasonic welding at the positions in which the anodes 29A extend from the capacitor elements 120A, 120B. The electrode strips 55 are cut from non-roughened aluminum foil. A procedure for fabrication of this capacitor element 120C will now be explained with reference to FIG. 15. FIG. 15 is a set of illustrations showing a procedure for fabrication of the capacitor element 120C.

First, an aluminum foil having a shape with a pair of protrusions 38 extending from one long side of a rectangular shape is cut out from an aluminum foil sheet which has been subjected to roughening treatment and had an aluminum oxide film 20 formed thereon. Rectangular electrode strips 59 are cut out from a non-surface-roughened aluminum foil sheet. Two electrode strips 59 are mounted in a partially overlapping fashion on the side opposite the long side from which the protrusions 38 extend, to fabricate an aluminum foil bonded structure 40A. Also, the ends of the electrode strips 59 are supported and the aluminum foil bonded structure 40A is immersed in a conversion solution 42 housed in a stainless steel beaker 41 (see FIG. 15A). A voltage is applied to the conversion solution 42 with the supported electrode strips 59 as plus and the stainless steel beaker 41 as minus. By thus performing conversion treatment of the aluminum foil bonded structure 40A with the conversion solution 42, there is formed an aluminum oxide film 20 on the ends of the aluminum base 18 exposed upon cutting from the foil sheet.

After the conversion treatment, the aluminum foil bonded structure 40A is immersed in the polymer solution 45 housed in the beaker 44, with the aluminum foil obtained by roughening treatment of the aluminum foil bonded structure 40A supported by the electrode strips 59, for chemical oxidative polymerization (or electrolytic oxidative polymerization) (see FIG. 15B). This forms a solid polymer electrolyte layer 22 over the entire surface of the roughened aluminum foil and over a portion of the electrolyte strips 59, on the aluminum foil bonded structure 40A. Since the surfaces of the electrode strips 59 are not roughened, penetration of the polymerization solution 45 into the electrode strips 59 by capillary action is preventing during the oxidative polymerization. In addition, since the aluminum oxide film 20 is also formed at the ends of the aluminum foil bonded structure 40A, shorting between the cathodes (solid polymer electrolyte layer, etc.) and anodes (aluminum body) is prevented.

A graphite paste layer 24 and silver paste layer 26 are also formed by dipping on the region where the solid polymer electrolyte layer 22 is formed on the surface of the aluminum foil bonded structure 40A. Finally, portions of the electrode strips 59 are cut into electrode strips 55, to obtain the capacitor element 120C shown in FIG. 14.

As explained above, this capacitor element 120C may also comprise stacks of the capacitor element 120C, similar to the capacitor elements 120A, 120B, to form a capacitor element combination similar to the capacitor element combination 120. That is, when the capacitor element 120C is used to form a capacitor element combination, each of the cathodes 29B are positioned on the same side as electrode strips 55 functioning in the same manner as the anodes 29A described above. In this capacitor element 120C, therefore, the electrostatic capacity is increased by the capacity of the cathode sections 32 formed on the cathodes 29B, without changing the external dimensions. Also, in a solid electrolyte capacitor (not shown) employing such a capacitor element combination having increased electrostatic capacity without changing the external dimensions, it is possible to increase the electrostatic capacity without changing the external dimensions of the solid electrolyte capacitor 100.

FIG. 16 is a general plan view showing a mode of a capacitor element combination which is different from the capacitor element combination 120 described above. The capacitor element combination 220 shown in FIG. 16 is composed of a capacitor element 120D and capacitor element 120E. Also, the capacitor element 120D and capacitor element 120A, and the capacitor element 120E and capacitor element 120B, differ only in the positions at which the electrode sections 29 extend. Specifically, the capacitor element 120D has cathodes (first electrodes) 29B extending from one side at positions corresponding to the positions between two anodes 29A extending from the opposite side. Also, the cathodes 29B of an element different from the element having the cathodes 29B are positioned so that the positions between the cathodes 29B and the aforementioned first electrodes 29B are the positions of the aforementioned anodes 29A.

Thus, electrodes 29 are provided in point symmetry with respect to the center of gravity of the capacitor element 120D in this capacitor element 120D. Also, capacitor element 120E is stacked with the electrodes 29 in the same positional relationship as the capacitor element 120D, to form a capacitor element combination 220. Since the capacitor element 120D and the capacitor element 120E are stacked together in a mirror image relationship with respect to the X direction, the anodes 29A and cathodes 29B in the capacitor element combination 220 are opposite each other.

Even with the capacitor element combination 220 having this positional relationship, the electrostatic capacity can be increased by the capacity of the cathode sections 32 formed on the cathodes 29B, without changing the external dimensions, since the cathodes 29B are positioned on the same side as the anodes 29A as in the capacitor element combination 120 described above.

Figure 17:
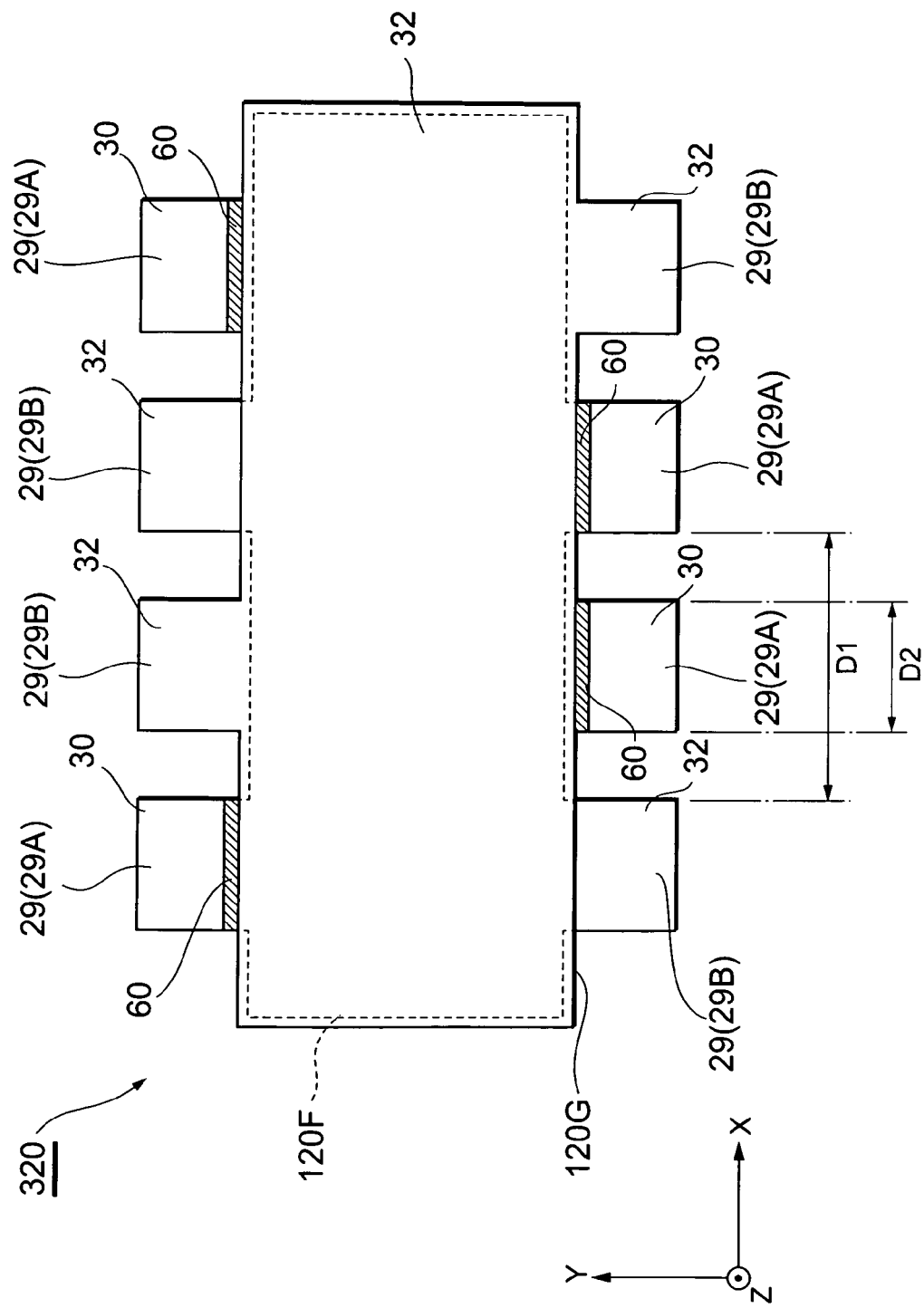
FIG. 17 shows yet a different mode of a capacitor element combination according to the invention.

FIG. 17 is a general plan view showing a mode of a capacitor element combination which is different from the capacitor element combination 120 described above. The capacitor element combination 320 shown in FIG. 17 is composed of a capacitor element 120F and capacitor element 120G. Also, the capacitor element 120F and capacitor element 120A, and the capacitor element 120G and capacitor element 120B, differ only in the electrodes 29 on which the anode sections 30 are formed. Specifically, in the capacitor element 120F and capacitor element 120G, one of the two electrodes 29 on the same side is an anode 29A and the other is a cathode 29B. Also, the positions of the cathodes 29B and the positions of the anodes 29A correspond on the opposite long sides. A procedure for fabrication of the capacitor elements 120F, 120G will now be explained with reference to FIG. 18. FIG. 18 is a set of illustrations showing a procedure for fabrication of the capacitor elements 120F, 120G.

First, an aluminum foil 40 having a pair of protrusions 38 extending from the opposite long sides is cut out from an aluminum foil sheet which has been subjected to roughening and had an aluminum oxide film 20 formed thereon. Next, the base sections of the protrusions 38 serving as the anodes 29A, i.e. the banded areas (for example, 1 mm wide) between the anode section regions and the cathode section regions, are compacted to break the roughened structure at those sections, thereby forming insulating grooves 60. Formation of the insulating grooves 60 results in segmentation of the roughened structure of the aluminum foil 40 into cathode section 32 regions and anode section 30 regions. Thus, during the step of forming the solid polymer electrolyte layer 22 described hereunder, the polymer solution penetrating into the cathode sections 32 can be reliably prevented from penetrating into the anode sections 30 by capillary action.

Next, as in the method for fabricating the capacitor elements 120A, 120B, the aluminum foil 40 is immersed into a conversion solution 42 (see FIG. 18A). The voltage is applied to the conversion solution 42 with the protrusions 38 as plus and the stainless steel beaker 41 as minus. By conversion treatment of the aluminum foil 40 with the conversion solution 42, there is formed an aluminum oxide film 20 on the aluminum base 18 at the ends exposed from the foil sheet upon cutting.

After the conversion treatment, a thermosetting resist 62 is coated onto the portions serving as the anode sections 30 (see FIG. 18B). Also, the portion of the aluminum foil 40 below the upper end of the resist 62 is immersed in a polymer solution 45 housed in a beaker 44 for chemical oxidative polymerization (or electrolytic oxidative polymerization), to form a solid polymer electrolyte layer 22 on the surface of the aluminum foil 40 (see FIG. 18C).

Here, since the irregularities on the surface of the roughened aluminum foil 40 are minute, it is difficult to densely form the resist 62 without gaps on the roughened surface. Consequently, the solid polymer electrolyte layer 22 is sometimes formed even in the regions covered by the resist 62 due to capillary action in the areas with the roughened structure. When this occurs, as explained above, insulating grooves 60 resulting from the broken roughened structure are formed at the borders between the anode sections 30 and cathode sections 32, thereby preventing the polymer solution 45 from penetrating into the anode section 30 regions from the cathode section 32 regions on which the solid polymer electrolyte layer 22 is formed.

A graphite paste layer 24 and silver paste layer 26 are also formed by dipping on the surface of the aluminum foil 40, in the region on which the solid polymer electrolyte layer 22 has been formed. Finally, the resist 62 is removed, while portions of the protrusions 38 are cut off to obtain the capacitor elements 120F, 120G shown in FIG. 17.

As explained above, in this capacitor element combination 320 as well, the electrostatic capacity is increased by the capacity of the cathode sections 32 formed on the cathodes 29B, without changing the external dimensions. Also, in a solid electrolyte capacitor 100 employing such a capacitor element combination 320 having increased electrostatic capacity without changing the external dimensions, it is possible to increase the electrostatic capacity without changing the external dimensions of the solid electrolyte capacitor 100.

The capacitor element may also be a mode wherein the electrodes extend from only one side. That is, as shown in FIG. 19, it may be a capacitor element combination 420 comprising a capacitor element 120H and capacitor element 120I are stacked, having the anodes 29A and cathodes 29B formed on one side 421, and the cathodes 29B may be positioned on the same side as the anodes 29A. There are no changes in the external dimensions of the capacitor elements 120H, 120I whether the cathodes 29B are formed on the capacitor elements 120H, 120I, or whether the cathodes 29B are not formed thereon. In this capacitor element combination 420, the electrostatic capacity is increased by the capacity of the cathode sections 32 formed on the cathodes 29B, without changing the external dimensions. Also, in a solid electrolyte capacitor 100 employing such a capacitor element combination 420 having increased electrostatic capacity without changing the external dimensions, it is possible to increase the electrostatic capacity without changing the external dimensions of the solid electrolyte capacitor 100. Furthermore, when the capacitor element combination 420 is mounted on a lead frame such as the lead frame 46 described above, the mounting operation is completed simply by bonding the capacitor element combination 420 on one side 421, thereby allowing the mounting operation to be simplified.

The present invention is not limited to the embodiments described above, and any of various modifications may be incorporated therein. For example, the number of capacitor elements of the capacitor element combination is not limited to two, and may be increased as appropriate. Also, although aluminum was used as the material for the valve metal base, the valve metal base may alternatively be formed of an aluminum alloy, or tantalum, titanium, niobium, zirconium or an alloy thereof, instead of aluminum. In addition, while a solid electrolyte capacitor with 8 ends was used for explanation of this embodiment, it is not limited to this mode, and for example, may be applied in the same manner to a solid electrolyte capacitor of a type having a greater or lesser number of ends.

The effect of the present invention will become even more apparent by the following examples and comparative examples.

EXAMPLE 1

A solid electrolyte capacitor was fabricated in the following manner.

The capacitor element was fabricated in the following manner by the fabrication method illustrated in FIG. 9. First, an aluminum foil was cut out to dimensions of 0.8 cm×2.0 cm from a 100 μm thick aluminum foil sheet which had been subjected to roughening treatment and had an aluminum oxide film formed thereover, and two locations were punched to dimensions of 0.2 cm×0.5 cm, at prescribed positions on two opposite ends. Also, three 0.25 cm×0.4 cm aluminum foils and one 1.25 cm×0.4 cm aluminum foil were cut out from a non-roughened 70 μm thick aluminum foil sheet.

The four aluminum foils (anode foils) were placed together with the punched sections of the roughened aluminum foils aligned, and stacked so that each end region on one side overlapped by 0.5 mm, with the sections where each end region overlapped being bonded and electrically connected using a 40 kHz Branson ultrasonic welding machine by Emerson Japan, Ltd., to fabricate a bonded structure (capacitor element electrode body) comprising the anode foil and the roughened aluminum foil.

The capacitor element electrode body obtained in this manner was immersed in a 3 wt % aqueous ammonium adipate solution adjusted to pH 6.0 so that the roughened aluminum foil was completely immersed. Next, the electrode foil was used as the anode for oxidation of the cut ends of the capacitor element electrode body immersed in the aqueous ammonium adipate solution under conditions with a chemical current density of 50-100 mA/cm$^2$ and a formation voltage of 12 volts, to form an aluminum oxide film. This conversion treatment resulted in formation of an aluminum oxide film on the surface of the electrode body.

Next, the electrode body was drawn out of the aqueous ammonium adipate solution while coating the thermosetting resist onto the anode foil sections of the electrode body, after which a solid polymer electrolyte layer made of polypyrrole was formed on the surface of the electrode body by chemical oxidative polymerization.

Here, the solid polymer electrolyte layer made of polypyrrole was produced by setting the electrode body in an ethanol water mixture cell containing a purified pyrrole monomer at 0.1 mole/liter, sodium alkylnaphthalenesulfonate at 0.1 mole/liter and iron (III) sulfate at 0.05 mole/liter, stirring over a period of 30 minutes to promote chemical oxidative polymerization, and repeating the same procedure 3 times. As a result, there was formed a solid polymer electrolyte layer having a maximum thickness of approximately 50 μm.

A carbon paste and silver paste were applied to the surface of the solid polymer electrolyte layer obtained in this manner by dip formation to form a cathode. After formation of the paste layer, the resist coated onto the anode foil sections was dissolved with an organic solvent to expose the anode sections. Also, the anode foil was cut at the sections extending from the roughened aluminum foil. This treatment completed the capacitor element (0.8 cm×2.0 cm).

The capacitor element fabricated in this manner was mounted on a lead frame which had been worked into the prescribed shape shown in FIG. 5, and the lowermost silver paste layer and lead frame were bonded with a conductive adhesive containing silver. Each of the anode sections of the capacitor element were welded to the anode lead sections of the lead frame using an NEC YAG laser spot welding machine, to integrate the capacitor element and the lead frame.

After the capacitor element was anchored onto the lead frame, it was molded with an epoxy resin by injection or transfer molding. The molded capacitor element was cut off from the lead frame, and the anode leads and cathode leads were bent to obtain a discrete-type solid electrolyte capacitor

1 having 8 ends, with the outer appearance shown in FIG. 1. Next, a constant voltage was applied to the solid electrolyte capacitor by a known method for aging treatment to adequately reduce the leakage current.

With regard to the electrical properties, electrostatic capacity and $S_{21}$ characteristic of the 8-ended solid electrolyte capacitor #1 obtained in the manner described above were measured, using a 4194A impedance analyzer and 8753D network analyzer by Agilent Technologies, and an equivalent circuit simulation was carried out based on the $S_{21}$ characteristic to determine the ESR and ESL values. As a result, the electrostatic capacity at 120 Hz was 144.0 μF, the ESR at 100 kHz was 20 mΩ, and the ESL was 155 pH.

EXAMPLE 2

A solid electrolyte capacitor was fabricated in the following manner.

First, an aluminum foil was cut out to dimensions of 0.8 cm×2.0 cm from a 100 μm thick aluminum foil sheet which had been subjected to roughening treatment. Also, an aluminum foil was cut out to dimensions of 1.05 cm×0.4 cm from a non-roughened 70 μm thick aluminum foil sheet. This aluminum foil was placed at a prescribed location, and stacked so that each end region on one side overlapped by 0.5 mm, with the sections where each end region overlapped being bonded and electrically connected using a 40 kHz Branson ultrasonic welding machine by Emerson Japan, Ltd., to fabricate a bonded structure (capacitor element electrode body) comprising the non-roughened aluminum foil and the roughened aluminum foil. Also, the capacitor element electrode body obtained in this manner was coated with a resist on the regions of the roughened aluminum foil which were to serve as the anode sections.

Also, the electrode body was subjected to conversion treatment to form a cathode (solid polymer electrolyte layer made of polypyrrole, carbon paste layer and silver paste layer) on the electrode body in the same manner as in Example 1. After forming the paste layer, the resist layer was dissolved with an organic solvent to expose the anode sections which had not been chemically treated. Also, the non-roughened aluminum foil was separated from the roughened aluminum foil. A 1 mm-wide insulating resin layer (silicone) was also formed at the borders between the exposed anode sections and cathode sections. This treatment completed a capacitor element having the same external dimensions as Example 1 (0.8 cm×2.0 cm).

The capacitor element fabricated in this manner was mounted on a lead frame which had been worked into the prescribed shape shown in FIG. 5, and the lowermost silver paste layer and lead frame were bonded with a conductive adhesive containing silver. Each of the anode sections of the capacitor element were welded to the anode lead sections of the lead frame using an NEC YAG laser spot welding machine, to integrate the capacitor element and the lead frame.

After the capacitor element was anchored onto the lead frame, it was molded with an epoxy resin by injection or transfer molding. The molded capacitor element was cut off from the lead frame, and the anode leads and cathode leads were bent to obtain a discrete-type solid electrolyte capacitor #2 having 8 ends, with the outer appearance shown in FIG. 1. Next, a constant voltage was applied to the solid electrolyte capacitor by a known method for aging treatment to adequately reduce the leakage current.

The electrical properties of the 8-ended solid electrolyte capacitor #2 obtained in the manner described above were evaluated by the same method as in Example 1. As a result, the electrostatic capacity at 120 Hz was 147.0 μF, the ESR at 100 kHz was 18 mΩ, and the ESL was 155 pH.

EXAMPLE 3

A solid electrolyte capacitor was fabricated in the following manner.

First, an aluminum foil was cut out to dimensions of 0.8 cm×2.0 cm from a 100 μm thick aluminum foil sheet on which a roughened aluminum oxide film had been formed, and 1 mm-wide, 2 mm-long slits were formed at 4 locations on each of the prescribed positions of the two opposing ends.

Also, an aluminum foil was cut out to dimensions of 1.05 cm×0.4 cm from a non-roughened 70 μm thick aluminum foil sheet. This aluminum foil was placed at a prescribed location, and stacked so that each end region on one side overlapped by 0.5 mm, with the sections where each end region overlapped being bonded and electrically connected using a 40 kHz Branson ultrasonic welding machine by Emerson Japan, Ltd., to fabricate a bonded structure (capacitor element electrode body) comprising the non-roughened aluminum foil and the roughened aluminum foil.

A capacitor element having the same external dimensions as Example 1 (0.8 cm×2.0 cm) was fabricated by the same method as in Example 1 from an aluminum foil electrode body fabricated in the manner described above. This capacitor element was used to fabricate an 8-ended solid electrolyte capacitor #3 having the same external dimensions as in Example 1, and the electrical properties were evaluated by the same method as in Example 1 and Example 2. As a result, the electrostatic capacity at 120 Hz was 146.0 μF, the ESR at 100 kHz was 19 mΩ, and the ESL was 155 pH.

COMPARATIVE EXAMPLE 1

First, an aluminum foil was cut out to rectangular dimensions of 0.4 cm×2.0 cm from a 100 μm thick aluminum foil sheet on which a roughened aluminum oxide film had been formed. Also, four aluminum foils were cut out to rectangular dimensions of 0.25 cm×0.4 cm from a non-roughened 70 μm thick aluminum foil sheet. These four aluminum foils were placed at prescribed spacings with two on each of the two opposite ends. The aluminum foils were then stacked so that each end region on one side overlapped by 0.5 mm, with the sections where each end region overlapped being bonded and electrically connected using a 40 kHz Branson ultrasonic welding machine by Emerson Japan, Ltd., to fabricate a bonded structure (capacitor element electrode body) comprising the non-roughened aluminum foil and the roughened aluminum foil.

This treatment produced a capacitor element electrode body having four non-roughened aluminum foils bonded onto a roughened aluminum foil.

A capacitor element (0.8 cm×2.0 cm) was fabricated by the same method as in Example 1 from an aluminum foil electrode body fabricated in the manner described above. This capacitor element was used to fabricate an 8-ended solid electrolyte capacitor #4 having the same external dimensions as in Example 1, and the electrical properties were evaluated by the same method as in Example 1, etc. As a result, the electrostatic capacity at 120 Hz was 93.0 μF, the ESR at 100 kHz was 37 mΩ, and the ESL was 156 pH.

EXAMPLE 4

A solid electrolyte capacitor was fabricated in the following manner.

First, the capacitor element was fabricated in approximately the same manner as the fabrication method illustrated in FIG. 15. Specifically, an aluminum foil was cut out to dimensions of 0.6 cm×2.0 cm from a 100 μm thick aluminum foil sheet which had been subjected to roughening treatment and had an aluminum oxide film formed thereover, and was subjected to punching to obtain an aluminum foil having the shape shown in FIG. 14. Also, one 0.25 cm×0.4 cm aluminum foil and one 1.25 cm×0.4 cm aluminum foil were cut out from a non-roughened 70 μm thick aluminum foil sheet.

These two aluminum foils (anode foil, electrode strip) were placed at prescribed positions and stacked so that each end region on one side overlapped by 0.5 mm, with the sections where each end region overlapped being bonded and electrically connected using a 40 kHz Branson ultrasonic welding machine by Emerson Japan, Ltd., to fabricate a bonded structure (capacitor element electrode body) comprising the anode foil and the roughened aluminum foil.

The capacitor element electrode body obtained in this manner was immersed in a 3 wt % aqueous ammonium adipate solution adjusted to pH 6.0 so that the roughened aluminum foil was completely immersed. Next, the long anode foil was used as the anode for oxidation of the cut ends of the capacitor element immersed in the aqueous ammonium adipate solution under conditions with a chemical current density of 50-100 mA/cm$^2$ and a formation voltage of 12 volts, to form an aluminum oxide film. This conversion treatment resulted in formation of an aluminum oxide film on the surface of the electrode body.

Next, the electrode body was drawn out of the aqueous ammonium adipate solution, and a solid polymer electrolyte layer made of polypyrrole was formed on the surface of the roughened aluminum foil by chemical oxidative polymerization.

Here, the solid polymer electrolyte layer made of polypyrrole was produced by setting the electrode body in an ethanol water mixture cell containing a purified pyrrole monomer at 0.1 mole/liter, sodium alkylnaphthalenesulfonate at 0.1 mole/liter and iron (III) sulfate at 0.05 mole/liter, stirring over a period of 30 minutes to promote chemical oxidative polymerization, and repeating the same procedure 3 times. As a result, there was formed a solid polymer electrolyte layer having a maximum thickness of approximately 50 μm.

A carbon paste and silver paste were applied to the surface of the solid polymer electrolyte layer obtained in this manner by dip formation to form a cathode. Finally, the anode foil used as the anode during the conversion treatment was cut off to complete the capacitor element (0.8 cm×2.0 cm).

Two capacitor elements were fabricated in this manner, and were stacked using a conductive adhesive without allowing the anode foils to contact each other. The capacitor element combination fabricated in this manner was mounted on a lead frame which had been worked into the prescribed shape shown in FIG. 13, and the lowermost silver paste layer and lead frame were bonded with a conductive adhesive containing silver. Each of the anode sections of the capacitor element combination were welded to the anode lead sections of the lead frame using an NEC YAG laser spot welding machine, to integrate the capacitor element combination and the lead frame.

After the capacitor element was anchored onto the lead frame, it was molded with an epoxy resin by injection or transfer molding. The molded solid electrolyte capacitor was cut off from the lead frame, and the anode leads and cathode leads were bent to obtain a discrete-type solid electrolyte capacitor #1 having 8 ends, as shown in FIG. 10. Next, a constant voltage was applied to the solid electrolyte capacitor by a known method for aging treatment to adequately reduce the leakage current.

With regard to the electrical properties, electrostatic capacity and $S_{21}$ characteristic of the 8-ended solid electrolyte capacitor #1 obtained in the manner described above were measured, using a 4194A impedance analyzer and 8753D network analyzer by Agilent Technologies, and an equivalent circuit simulation was carried out based on the $S_{21}$ characteristic to determine the ESR and ESL values. As a result, the electrostatic capacity at 120 Hz was 220.0 μF, the ESR at 100 kHz was 14 mΩ, and the ESL was 157 pH.

EXAMPLE 5

A solid electrolyte capacitor was fabricated in the following manner.

First, the capacitor element was fabricated according to the fabrication method illustrated in FIG. 12. Specifically, an aluminum foil was cut out to dimensions of 0.8 cm×2.0 cm from a 100 μm thick aluminum foil sheet which had been subjected to roughening treatment, and was subjected to punching to obtain an aluminum foil having the shape shown in FIG. 11. A 1 mm-thick insulating resin layer was also formed at the base sections of the electrodes. The regions on which the insulating resin layer is formed are alternatively compacted to break the roughened structure.

An aluminum foil was cut out to dimensions of 1.05 cm×0.4 cm from a non-roughened 70 μm thick aluminum foil sheet. The aluminum foil (anode foil) was placed at a prescribed position and stacked so that each end region on one side overlapped by 0.5 mm, with the sections where each end region overlapped being bonded and electrically connected using a 40 kHz Branson ultrasonic welding machine by Emerson Japan, Ltd., to fabricate a bonded structure (capacitor element electrode body) comprising the anode foil and the roughened aluminum foil.

Then, in the same manner as Example 4, the capacitor element electrode body obtained in this manner was immersed in an aqueous ammonium adipate solution so that the roughened aluminum foil was completely immersed, for conversion treatment, while a cathode (solid polymer electrolyte layer made of polypyrrole, carbon paste layer and silver paste layer) was formed on the electrode body. This treatment completed the capacitor element (0.8 cm×2.0 cm).

Two capacitor elements were fabricated in this manner, and were stacked using a conductive adhesive without allowing the anode foils to contact each other. The capacitor element combination fabricated in this manner was mounted on a lead frame which had been worked into the prescribed shape shown in FIG. 13, and the lowermost silver paste layer and lead frame were bonded with a conductive adhesive containing silver. Each of the anode sections of the capacitor element combination were welded to the anode lead sections of the lead frame using an NEC YAG laser spot welding machine, to integrate the capacitor element combination and the lead frame.

After the solid electrolyte capacitor element was anchored onto the lead frame, it was molded with an epoxy resin by injection or transfer molding. The molded solid electrolyte capacitor was cut off from the lead frame, and the anode leads and cathode leads were bent to obtain a discrete-type solid electrolyte capacitor #2 having 8 ends, as shown in FIG. 10. Next, a constant voltage was applied to the solid electrolyte capacitor by a known method for aging treatment to adequately reduce the leakage current.

The electrical properties of the 8-ended solid electrolyte capacitor #1 obtained in the manner described above were evaluated by the same method as in Example 4. As a result, the electrostatic capacity at 120 Hz was 224.0 µF, the ESR at 100 kHz was 13 mΩ, and the ESL was 157 pH.

COMPARATIVE EXAMPLE 2

First, an aluminum foil was cut out to rectangular dimensions of 0.4 cm×2.0 cm from a 100 µm thick aluminum foil sheet which had been subjected to roughening treatment and had an aluminum oxide film formed thereon. Also, two aluminum foils were cut out to rectangular dimensions of 0.25 cm×0.4 cm from a non-roughened 70 µm thick aluminum foil sheet. The two aluminum foils (anode foils) were placed at a spacing of a prescribed distance from one end of the roughened aluminum foil. In addition, the anode foils were stacked so that each end region overlapped the roughened aluminum foil by 0.5 mm, with the overlapping sections being bonded and electrically connected using a 40 kHz Branson ultrasonic welding machine by Emerson Japan, Ltd., to fabricate a bonded structure (capacitor element electrode body) comprising the non-roughened aluminum foil and the roughened aluminum foil.

Then, in the same manner as Example 4, the capacitor element electrode body was immersed in an aqueous ammonium adipate solution so that the roughened aluminum foil was completely immersed, for conversion treatment, while a cathode (solid polymer electrolyte layer made of polypyrrole, carbon paste layer and silver paste layer) was formed on the electrode body. This treatment completed the capacitor element (0.6 cm×2.0 cm).

Two capacitor elements were fabricated in this manner, and were stacked using a conductive adhesive without allowing the anode foils to contact each other, and with the two capacitor elements at point symmetry around the center of gravity of the aluminum foil. The capacitor element combination fabricated in this manner was mounted on a lead frame which had been worked into the prescribed shape shown in FIG. 13, and the lowermost silver paste layer and lead frame were bonded with a conductive adhesive containing silver. Each of the anode sections of the capacitor element combination were welded to the anode lead sections of the lead frame using an NEC YAG laser spot welding machine, to integrate the capacitor element combination and the lead frame.

After the solid electrolyte capacitor element was anchored onto the lead frame, it was molded with an epoxy resin by injection or transfer molding. The molded solid electrolyte capacitor was cut off from the lead frame, and the anode leads and cathode leads were bent to obtain a discrete-type solid electrolyte capacitor #3 having 8 ends, as shown in FIG. 10. Next, a constant voltage was applied to the solid electrolyte capacitor by a known method for aging treatment to adequately reduce the leakage current.

The electrical properties of the 8-ended solid electrolyte capacitor #3 obtained in the manner described above were evaluated by the same method as in Example 4. As a result, the electrostatic capacity at 120 Hz was 186.0 µF, the ESR at 100 kHz was 20 mΩ, and the ESL was 158 pH.

COMPARATIVE EXAMPLE 3

First, an aluminum foil was cut out to dimensions of 0.6 cm×2.0 cm from a 100 µm thick aluminum foil sheet which had been subjected to roughening treatment, and was subjected to punching to obtain an aluminum foil having the shape shown in FIG. 19. A 1 mm-thick insulating resin layer was also formed at the base sections of the electrodes. Also, an aluminum foil was cut out to dimensions of 1.05 cm×0.4 cm from a non-roughened 70 µm thick aluminum foil sheet. The aluminum foil (anode foil) was placed at a prescribed position and stacked so that each end region overlapped by 0.5 mm, with the sections where each end region overlapped being bonded and electrically connected using a 40 kHz Branson ultrasonic welding machine by Emerson Japan, Ltd., to fabricate a bonded structure (capacitor element electrode body) comprising the anode foil and the roughened aluminum foil.

Then, in the same manner as Example 4, the capacitor element electrode body was immersed in an aqueous ammonium adipate solution so that the roughened aluminum foil was completely immersed, for conversion treatment, while a cathode (solid polymer electrolyte layer made of polypyrrole, carbon paste layer and silver paste layer) was formed on the electrode body. This treatment completed the capacitor element (0.6 cm×2.0 cm).

Two capacitor elements were fabricated in this manner, and were stacked using a conductive adhesive without allowing the anode foils to contact each other, and with the two capacitor elements at point symmetry around the center of gravity of the aluminum foil. The capacitor element combination fabricated in this manner was mounted on a lead frame which had been worked into the prescribed shape shown in FIG. 13, and the lowermost silver paste layer and lead frame were bonded with a conductive adhesive containing silver. Each of the anode sections of the capacitor element combination were welded to the anode lead sections of the lead frame using an NEC YAG laser spot welding machine, to integrate the capacitor element combination and the lead frame.

After the solid electrolyte capacitor element was anchored onto the lead frame, it was molded with an epoxy resin by injection or transfer molding. The molded solid electrolyte capacitor was cut off from the lead frame, and the anode leads and cathode leads were bent to obtain a discrete-type solid electrolyte capacitor #4 having 8 ends, as shown in FIG. 10. Next, a constant voltage was applied to the solid electrolyte capacitor by a known method for aging treatment to adequately reduce the leakage current.

The electrical properties of the 8-ended solid electrolyte capacitor #4 obtained in the manner described above were evaluated by the same method as in Example 4. As a result, the electrostatic capacity at 120 Hz was 188.0 µF, the ESR at 100 kHz was 18 mΩ, and the ESL was 158 pH.

Thus, the solid electrolyte capacitors of Examples 1 to 5 can adequately increase electrostatic capacity while maintaining the same dimensional shape, i.e., without increasing the external dimensions, whereas the solid electrolyte capacitors of Comparative Examples 1 to 3 could not adequately increase electrostatic capacity with the same dimensional shape.

This confirmed that a solid electrolyte capacitor according to the present invention can adequately increase electrostatic capacity while maintaining the same dimensional shape, i.e., without increasing the external dimensions.

INDUSTRIAL APPLICABILITY

As explained above, the present invention provides a capacitor element and solid electrolyte capacitor which can adequately increase electrostatic capacity while maintaining the same dimensional shape, i.e., without increasing the external dimensions, as well as a process for their production, and a capacitor element combination.

The invention claimed is:

1. A capacitor element comprising
   a valve metal base having a shape with plurality of sides,
   anode sections partially formed at the edge region of at least one side among the plurality of sides of the valve metal base,
   cathode sections comprising a solid electrolyte layer formed on said valve metal base via a dielectric layer and a conductive layer formed on said solid electrolyte layer, which are formed on the remaining regions from the regions on which said anode sections are formed, in the area on the main surface of said valve metal base, and
   insulating sections which serve as electrical insulation between said anode sections and said cathode sections.

2. A capacitor element according to claim 1, wherein said valve metal base has a roughly square shape,
   and said anode sections are formed at the edge regions of two opposite sides of said plurality of sides.

3. A capacitor element according to claim 1, wherein a plurality of said anode sections are formed on said edge region of each side.

4. A capacitor element according to claim 1, wherein at least portions of said insulating sections are formed of an insulating member lying between said anode sections and said cathode sections.

5. A capacitor element according to claim 1, wherein at least portions of said insulating sections are formed by slits provided so as to partition said anode sections and said cathode sections.

6. A capacitor element according to claim 1, wherein said valve metal base comprises
   a first metal body having a plurality of sides, with recesses in the edge region of at least one side of the plurality of sides, and
   a second metal body connected as said anode section to the periphery of said recesses so as to fill said recesses.

7. A process for production of a capacitor element, which comprises
   a first step of partially forming anode sections at the edge region of at least one side among the plurality of sides in the area on the main surface of a valve metal base having a shape with a plurality of sides,
   a second step of electrically insulating said anode sections and said cathode sections with insulating sections, and
   a third step of forming cathode sections by laminating a solid electrolyte layer and a conductive layer on the remaining regions from the regions on which said anode sections are formed, in the area on the main surface of the valve metal base, via a dielectric layer.

8. A solid electrolyte capacitor provided with a capacitor element comprising a valve metal base having a shape with plurality of sides, anode sections partially formed at the edge region of at least one side among said plurality of sides in the area on main surface of said valve metal base, cathode sections comprising a solid electrolyte layer formed on said valve metal base via a dielectric layer and a conductive layer formed on said solid electrolyte layer, which are formed on the remaining regions from the regions on which the anode sections are formed, in the area on the main surface of said valve metal base, and insulating sections which serve as electrical insulation between said anode sections and said cathode sections,
   and leads connected to said anode sections and said cathode sections.

9. A process for production of a solid electrolyte capacitor, which comprises
   a first step of partially forming anode sections at the edge region of at least one side among the plurality of sides in the area on the main surface of a valve metal base having a shape with a plurality of sides,
   a second step of electrically insulating said anode sections and said cathode sections with insulating sections,
   a third step of forming cathode sections by laminating a solid electrolyte layer and a conductive layer on the remaining regions from the regions on which said anode sections are formed, on the surface of said valve metal base, via a dielectric layer, and
   a fourth step of connecting leads to said anode sections and said cathode sections.

10. A capacitor element combination composed of a stack of capacitor elements each provided with
    a valve metal base having a plurality of sides and having a plurality of electrode sections extending from at least one side,
    anode sections formed on some of said electrode sections among said plurality of electrode sections extending from said valve metal base, and
    cathode sections comprising a solid electrolyte layer formed on the remaining regions from the regions of said electrode sections on which said anode sections are formed, in the area on the surface of said valve metal base, via a dielectric layer, and a conductive layer formed on said solid electrolyte layer,
    wherein between electrode sections of one of said capacitor elements there are positioned electrode sections of another of said capacitor elements,
    and said electrode sections having said cathode sections formed thereon are positioned on the same side of said electrode sections on which said anode sections are formed.

11. A capacitor element combination according to claim 10,
    wherein said valve metal body has a rectangular shape, with two of said electrode sections extending from each of the two opposite sides, and
    wherein said anode sections are formed on two electrode sections extending from one side among said electrode sections, while said cathode sections are formed on two electrode sections extending from the other side.

12. A capacitor element combination according to claim 11, wherein said electrode sections are each extending from positions corresponding to the positions of said electrode sections formed on opposite sides.

13. A capacitor element combination according to claim 11,
    wherein the first electrode section, which is one of two of said electrode sections extending from one side, is located at a position corresponding to the position between said two electrode sections extending from the other side,
    while the other of said electrode sections extending from the one side is located so that the position corresponding to the position between that electrode section and said first electrode section is the position of one of said two electrode sections extending from said other side.

14. A capacitor element combination according to claim 10,
wherein said valve metal body has a rectangular shape, with two of said electrode sections extending from each of the two opposite sides, and
wherein said anode sections are formed on one of said electrode sections extending from each side, while said cathode sections are formed on the other.

15. A capacitor element combination according to claim 10, wherein said valve metal base has a rectangular shape, and two electrode sections extend from one side,
wherein said anode sections are formed on one of said two electrode sections and cathode sections are formed on the other.

16. A solid electrolyte capacitor provided with
a capacitor element combination composed of a stack of capacitor elements each provided with a valve metal base having a plurality of sides and having a plurality of electrode sections extending from at least one side, anode sections formed on some of said electrode sections among said plurality of electrode sections extending from said valve metal base, cathode sections comprising a solid electrolyte layer formed on the remaining regions from the regions of said electrode sections on which said anode sections are formed, in the area on the surface of said valve metal base, via a dielectric layer, and a conductive layer formed on said solid electrolyte layer, wherein said electrode sections of one of said capacitor elements there are positioned said electrode sections of another of said capacitor elements, and said electrode sections having said cathode sections formed thereon are positioned on the same side of said electrode sections on which said anode sections are formed, and
leads connected to said anode sections and said cathode sections.

17. A capacitor element suitable for a solid electrolyte capacitor, provided with a capacitor element composed of a stack of capacitor elements each provided with
a valve metal base having a plurality of sides and having a plurality of electrode sections extending from at least one side,
anode sections formed on some of said electrode sections among said plurality of electrode sections extending from said valve metal base, and
cathode sections comprising a solid electrolyte layer formed on the remaining regions from the regions of said electrode sections on which said anode sections are formed, in the area on the surface of said valve metal base, via a dielectric layer, and a conductive layer formed on said solid electrolyte layer,
wherein the spacing between adjacent electrode sections is wider than the widths of said electrode sections in the direction along the side of said valve metal base from which said electrode sections extend.

* * * * *